US009975777B2

(12) United States Patent
Fasel et al.

(10) Patent No.: US 9,975,777 B2
(45) Date of Patent: May 22, 2018

(54) SEGMENTED GRAPHENE NANORIBBONS

(71) Applicants: BASF SE, Ludwigshafen (DE); EMPA MATERIALS SCIENCE AND TECHNOLOGY, Duebendorf (CH)

(72) Inventors: Roman Fasel, Zurich (CH); Pascal Ruffieux, Plasselb (CH); Klaus Muellen, Cologne (DE); Stephan Blankenburg, Stuttgart (DE); Jinming Cai, Zurich (CH); Xinliang Feng, Mainz (DE); Carlo Pignedoli, Zurich (CH); Daniele Passerone, Zurich (CH)

(73) Assignees: BASF SE, Ludwigshafen (DE); EMPA MATERIALS SCIENCE AND TECHNOLOGY, Duebendorf (CH)

( * ) Notice: Subject to any disclaimer, the term of this patent is extended or adjusted under 35 U.S.C. 154(b) by 615 days.

(21) Appl. No.: 14/357,300

(22) PCT Filed: Nov. 13, 2012

(86) PCT No.: PCT/EP2012/072445
§ 371 (c)(1),
(2) Date: May 9, 2014

(87) PCT Pub. No.: WO2013/072292
PCT Pub. Date: May 23, 2013

(65) Prior Publication Data
US 2014/0315023 A1 Oct. 23, 2014

Related U.S. Application Data

(60) Provisional application No. 61/559,161, filed on Nov. 14, 2011.

(30) Foreign Application Priority Data

Nov. 14, 2011 (EP) ..................................... 11188978

(51) Int. Cl.
*C01B 31/04* (2006.01)
*C01B 31/00* (2006.01)
(Continued)

(52) U.S. Cl.
CPC .......... *C01B 31/0446* (2013.01); *B82Y 30/00* (2013.01); *B82Y 40/00* (2013.01);
(Continued)

(58) Field of Classification Search
CPC . C01B 31/0438; C01B 31/00; C01B 31/0446; C01B 2204/06; C01B 2204/065;
(Continued)

(56) References Cited

U.S. PATENT DOCUMENTS 7,968,872 B2 6/2011 Schäfer et al.
2009/0174435 A1 7/2009 Stan et al.
(Continued)

FOREIGN PATENT DOCUMENTS

JP 2002-356317 A 12/2002
JP 2015-510520 A 4/2015
(Continued)

OTHER PUBLICATIONS

Heyrovska, Atomic Structures of Graphene, Benzene and Methane with Bond Lengths as Sums of the Single, Double and Resonance Bond Radii of Carbon, accessed online at https://arxiv.org/ftp/arxiv/papers/0804/0804.4086.pdf on Nov. 28, 2016.*
(Continued)

*Primary Examiner* — Daniel C McCracken
(74) *Attorney, Agent, or Firm* — Oblon, McClelland, Maier & Neustadt, L.L.P.

(57) ABSTRACT

The present invention relates to a segmented graphene nanoribbon, comprising at least two different graphene segments covalently linked to each other, each graphene segment having a monodisperse segment width, wherein the
(Continued)

Figure 1:
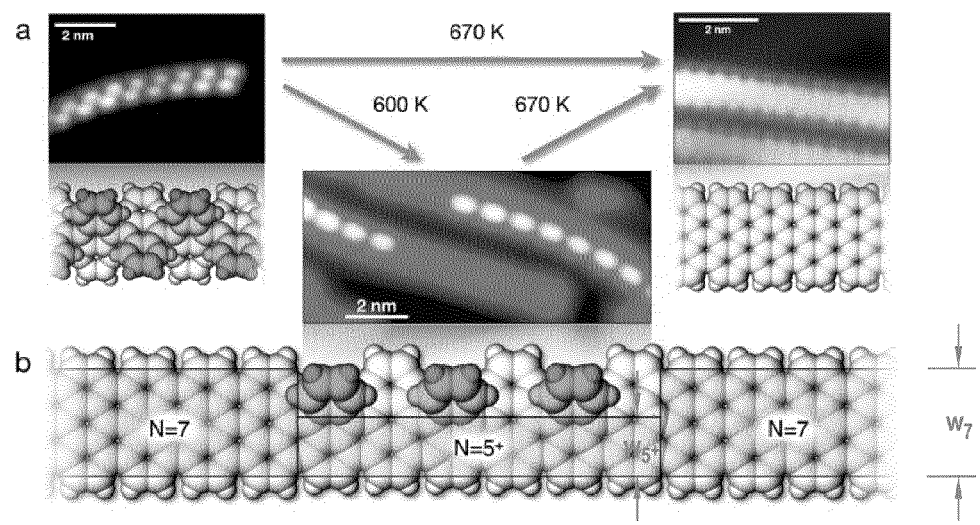

segment width of at least one of said graphene segments is 4 nm or less and to a method for preparing it by polymerizing at least one polycyclic aromatic monomer compound and/or at least one oligo phenylene aromatic hydrocarbon monomer compound to form at least one polymer and by at least partially cyclodehydrogenating the one or more polymer.

27 Claims, 3 Drawing Sheets

(51) Int. Cl.
C08G 61/10 (2006.01)
B82Y 30/00 (2011.01)
B82Y 40/00 (2011.01)
C01B 32/00 (2017.01)
C01B 32/182 (2017.01)
C01B 32/184 (2017.01)

(52) U.S. Cl.
CPC ............ C01B 32/00 (2017.08); C01B 32/182 (2017.08); C01B 32/184 (2017.08); C08G 61/10 (2013.01); C01B 2204/06 (2013.01); C01B 2204/065 (2013.01); C08G 2261/148 (2013.01); C08G 2261/312 (2013.01); C08G 2261/314 (2013.01); Y10S 977/734 (2013.01); Y10S 977/842 (2013.01); Y10S 977/896 (2013.01); Y10S 977/932 (2013.01); Y10T 428/298 (2015.01); Y10T 428/2982 (2015.01)

(58) Field of Classification Search
CPC .............. C08G 61/10; C08G 2261/148; C08G 2261/312; C08G 2261/314; B82Y 40/00; B82Y 30/00; Y10S 977/896; Y10S 977/842; Y10S 977/734; Y10S 977/932; Y10T 428/02
USPC ......... 428/401, 402; 423/448; 977/734, 812, 977/896, 932
See application file for complete search history.

(56) References Cited

U.S. PATENT DOCUMENTS

| | | |
|---|---|---|
| 2010/0028681 A1 | 2/2010 | Dai et al. |
| 2010/0047154 A1 | 2/2010 | Lee et al. |
| 2011/0097258 A1 | 4/2011 | Lee et al. |
| 2011/0143045 A1 | 6/2011 | Veerasamy |
| 2011/0261605 A1 | 10/2011 | Kioussis et al. |

FOREIGN PATENT DOCUMENTS

| | | |
|---|---|---|
| KR | 10-2011-0005436 A | 1/2011 |
| WO | WO 2007/013883 A2 | 2/2007 |
| WO | WO 2010/097393 A1 | 9/2010 |
| WO | WO 2013/045579 A1 | 4/2013 |
| WO | WO 2013/061256 A1 | 5/2013 |

OTHER PUBLICATIONS

Japanese Office Action dated Aug. 3, 2015 in Patent Application No. 2014-540510 (English Translation only).
International Preliminary Report on Patentability and Written Opinion dated May 30, 2014 in PCT/EP2012/072445.
Notice of Preliminary Rejection dated Jul. 21, 2015 in Korean Patent Application No. 10-2014-7015131 (with English language translation).
International Search Report dated Apr. 22, 2013 in PCT/EP2012/072445.
Xiaolin Li, et al., "Chemically Derived, Ultrasmooth Graphene Nanoribbon Semiconductors", Science, vol. 319, No. 5867, XP055024804, Feb. 29, 2008, pp. 1229-1232.
Jinming Cai, et al., "Atomically precise bottom-up fabrication of graphene nanoribbons", Nature, vol. 466, No. 7305, XP055022095, Jul. 22, 2010, pp. 470-473.
Zhihong Chen, et al., "Graphene Nano-Ribbon Electronics," Physica E: Low-dimensional Systems and Nanostructures, vol. 40/2, Dec. 2007, pp. 228-232.
Melinda Y. Han, et al., "Energy Band-Gap Engineering of Graphene Nanoribbons," Physical Review Letters 98, 206805, May 2007, 4 pp.

* cited by examiner

SEGMENTED GRAPHENE NANORIBBONS

The present invention relates to a segmented graphene nanoribbon and a method for preparing such graphene nanoribbons.

Graphene, an atomically thin layer from graphite, has received considerable interest in physics, material science and chemistry since the recent discovery of its appealing electronic properties. These involve superior charge carrier mobility and the quantum Hall effect. Moreover, its chemical robustness and material strength make graphene an ideal candidate for applications ranging from transparent conductive electrodes to devices for charge and energy storage.

Graphene nanoribbons (GNRs) are linear structures that are derived from the parent graphene lattice. Their characteristic feature is high shape-anisotropy due to the increased ratio of length over width. Currently, their usage in yet smaller, flatter and faster carbon-based devices and integrated circuits is being widely discussed in material science. In contrast to graphene, armchair-type GNRs exhibit an electronic band gap that is strongly dependent on their width. At the same time the edge structure of the GNRs has a strong impact on the electronic properties. Computational simulations and experimental results on smaller nanographenes suggest that GNRs exhibiting nonbonding $\pi$-electron states at zigzag edges can be used as active component in spintronic devices.

Graphene nanoribbons (GNRs) are promising building blocks for novel graphene based electronic devices. Beyond the most important distinction between electrically conducting zig-zag edge (ZGNR) and predominantly semiconducting armchair edge ribbons (AGNR), more general variations of the geometry of a GNR allow for gap tuning through one-dimensional (1D) quantum confinement. In general, increasing the ribbon width leads to an overall decrease of the band gap, with superimposed oscillation features that are maximized for armchair GNRs (AGNRs).

In this respect, intra-GNR heterostructures might provide a completely new concept for the realization of (opto-) electronic devices. Indeed, using GNRs as building blocks rather than semiconducting crystalline thin films, the unique quantum properties of the constituents can be fully exploited, and the interface between different GNRs can potentially be realized without defects. Band gap tuning between different components of the heterojunction can then simply be achieved by varying the width of the components rather than their chemical composition, potentially allowing for "allcarbon" device components. A variety of electronic components for integrated circuits and other devices that can be made out of GNR heterojunctions are e.g. described in patent application US2009/0174435.

However, standard top-down fabrication techniques such as cutting graphene sheets e.g. using lithography, unzipping of carbon nanotubes (e.g. described in US2010/0047154 and US2011/0097258), or using nanowires as a template (e.g. described in KR2011/005436) are not suitable for ribbons narrower than 5-10 nm, because the edge configuration is not precisely controlled and they do not yield ribbons with a monodisperse width distribution. For high-efficiency electronic devices, the ribbons need to be much smaller than 10 nm wide, their width needs to be precisely controlled and, importantly, their edges need to be smooth because even minute deviations from the ideal edge shapes seriously degrade the electronic properties.

The strong interest in heterojunctions and heterostructures (combinations of multiple heterojunctions) derives from the fact that they are the fundamental building blocks of modern high-speed- and opto-electronics. Semiconductor heterostructures are usually manufactured by stacking crystalline materials exhibiting different electronic band gaps, which requires the use of molecular beam epitaxy or chemical vapor deposition technologies in order to precisely control the 2D interface. Lateral heterojunctions represent an even harder challenge. Polycrystalline graphene allows to exploit (intrinsically lateral) grain boundaries acting as 1D interfaces, and the orientation of confining domain boundaries can be related to the electronic and transport properties. Going from 1D interfaces to "0D" heterojunctions consisting of a finite set of atoms with controlled structure thus appears to be a highly appealing next step.

Due to the inherent limitations of lithographic methods and of other known approaches to fabricate graphene nanostructures, however, the experimental realization of GNR heterojunctions with the required high precision has remained elusive. Bottom-up approaches based on cyclodehydrogenation reactions in solution (e.g. Dössel, L.; Gherghel, L.; Feng, X.; Müllen, K. Angew. Chem. Int. Ed. 50, 2540-2543 (2011)) or on solid substrates (e.g. Cai, J.; et al. Nature 466, 470-473 (2010)) have recently emerged as promising routes to the synthesis of nanoribbons and nanographenes with precisely controlled edge structures.

For solution-based approaches using oligophenylene precursors a polymer is typically prepared in a first step which is subsequently converted into the graphitic structure by Scholl-type oxidative cyclodehydrogenation. However, the design of the parent monomer must be carefully adjusted in order to guarantee for a suitable arrangement of the aromatic units upon the chemistry-assisted graphitization into the final GNR structure.

J. Wu, L. Gherghel, D. Watson, J. Li, Z. Wang, C. D. Simpson, U. Kolb, and K. Müllen, Macromolecules 2003, 36, 7082-7089 report the synthesis of graphitic nanoribbons obtained by intramolecular oxidative cyclodehydrogenation of soluble branched poly-phenylenes, which were prepared by repetitive Diels-Alder cycloaddition of 1,4-bis(2,4,5-triphenylcyclopentadienone-3-yl)benzene and diethynylterphenyl. The obtained graphene ribbons are not linear but rather contain statistically distributed "kinks" due to the structural design of the polyphenylene precursor.

Y. Fogel, L. Zhi, A. Rouhanipour, D. Andrienko, H. J. Räder, and K. Müllen, Macromolecules 2009, 42, 6878-6884 report the synthesis of a homologous series of five monodisperse ribbon-type polyphenylenes, with rigid dibenzopyrene cores in the repeat units, by microwave-assisted Diels-Alder reaction. The size of the obtained polyphenylene ribbons ranges from 132 to 372 carbon atoms in the aromatic backbone which incorporates up to six dibenzopyrene units. Because of the flexibility of the back-bone and the peripheral substitution with dodecyl chains, the polyphenylene ribbons are soluble in organic solvents. In a further reaction step, ribbon-type polycyclic aromatic hydrocarbons (PAHs) are prepared by cyclodehydrogenation.

All these solution based methods are leading to non segmented graphene nanoribbons and do not allow to control the cyclodehydrogenation step in a way that could yield segmented ribbons. Furthermore all these methods are yielding extremely insoluble GNR products which are aggregating irreversibly in solution and cannot be treated as individual graphene ribbons, but rather as graphitic carbon.

A surface-confined bottom-up approach to controlled graphene nanoribbons has been described in J. Cai et al., Nature 466, pp. 470-473 (2010). However, no segmented GNR structures have been obtained.

It is an object of the present invention to provide a graphene nanoribbon (GNR) of precisely controlled edge configuration and well defined width which can be useful for generating heterojunctions, and a process for preparing such a graphene nanoribbon.

According to a first aspect, the present invention provides a segmented graphene nanoribbon, comprising at least two different graphene segments covalently linked to each other, each graphene segment having a monodisperse segment width, wherein the segment width of at least one of said graphene segments is 4 nm or less.

The segment width is measured with scanning tunneling microscopy (STM). The apparent width is corrected for the finite tip radius by STM simulation as explained in J. Cai et al., Nature 466, pp. 470-473 (2010). The STM images are simulated according to the Tersoff-Hamann approach with an additional rolling ball algorithm to include tip effects on the apparent ribbon width. The integrated density of states between the Fermi energy and the Fermi energy plus a given sample bias are extracted from a Gaussian and plane waves approach for the given geometries.

In the case of the bottom-up synthesis approach, which is used in the present invention as will be described in further detail below, the width of a segment can be adjusted inter alia by the structure of the segment repeating unit (i.e. the structure of the monomer compound(s) from which the repeating unit is derived) and the degree of cyclodehydrogenation, which can be determined using scanning tunneling microscopy. In principle, the segment width could then be directly calculated on the basis of this information.

Similar to conventional polymers, each segment of the segmented graphene nanoribbon has its specific repeating unit. The term "repeating unit" relates to the part of the segment whose repetition would produce the complete segment (except for the ends) by linking the repeating units together successively along the segment. Different neighbouring segments have different repeating units.

The expression "monodisperse segment width" means that the segment has a constant width over its length with a standard deviation of less than 0.30 nm, more preferably less than 0.15 nm, or even less than 0.10 nm, if measured by STM.

Preferably, each graphene segment of the segmented graphene nanoribbon has a monodisperse segment width of 4 nm or less, more preferably 3 nm or less, even more preferably 2 nm or less.

As will be discussed below in further detail, different neighbouring graphene segments preferably differ in their monodisperse segment width. However, in the present invention, it is also possible that two or more neighbouring graphene segments have the same monodisperse segment width, but differ in at least one other property.

Preferably, each graphene segment has a repeating unit which is derived from at least one substituted or unsubstituted polycyclic aromatic monomer compound, more preferably at least one substituted or unsubstituted polycyclic aromatic hydrocarbon monomer compound, and/or from at least one substituted or unsubstituted oligo phenylene aromatic hydrocarbon monomer compound.

As will be discussed below in further detail, each graphene segment is obtained by polymerizing at least one substituted or unsubstituted polycyclic aromatic monomer compound and/or at least one substituted or unsubstituted oligo phenylene aromatic hydrocarbon monomer compound. Substituted or unsubstituted polycyclic aromatic monomer compounds from which the repeating unit of a segment can be derived include e.g. naphthalene, anthracene, tetracene, pentacene, hexacene, heptacene, octacene, nonacene, phenanthrene, bisanthene, trisanthene, chrysene, pyrene, triphenylene, benzo[a]pyrene, perylene, coronene, all of which can be substituted or unsubstituted. Substituted or unsubstituted oligo phenylene aromatic hydrocarbon monomer compounds from which the repeating unit of a segment can be derived include e.g. biphenyl, triphenyl, tetraphenyl, pentaphenyl, hexaphenyl, heptaphenyl, octaphenyl, all of which can be substituted or unsubstituted.

Segment width of a graphene segment can also be expressed by the number of annelated aromatic rings of the graphene segment repeating unit across the segment width. Preferably, the repeating units of the graphene segments have 17 or less, more preferably 8 or less annelated aromatic rings across the segment width. As a preferred lower limit, the repeating units of the graphene segments preferably have at least 2 or at least 3 annelated aromatic rings across the segment width.

The graphene segments can also be linked to at least one oligophenylene-derived segment that does not contain annelated aromatic rings across the segment width.

Alternatively, according to conventional notion, segment width of an armchair graphene segment can also be expressed by the number N of dimer lines or carbon atom pairs across the segment width (K. Wakabayashi et al., Sci. Technol. Adv. Mater. 11 (2010) 054504). Just as an example, a fully annelated (i.e. fully cyclodehydrogenated) non-segmented graphene nanoribbon with a pentacene-based repeating unit would have a number of dimer lines across the segment width of N=11.

The repeating units of the different graphene segments can have a number N of dimer lines across the segment width of from 3 to 38, more preferably of from 3 to 21, or of from 5 to 20.

As outlined above, the segmented graphene nanoribbon comprises at least two different graphene segments which means that at least two graphene segments differ in their repeating units.

Preferably, the repeating units of different graphene segments differ at least in one or more of the following properties selected from segment width, substituents attached to the repeating unit, degree of annelation of aromatic rings or degree of cyclodehydrogenation, and/or number of annelated aromatic rings.

The degree of annelation indicates to what extent neighbouring polycyclic aromatic and/or oligo phenylene aromatic groups are fused together by cyclodehydrogenation. As will be discussed in further detail below, if there is full cyclodehydrogenation in a specific region of the graphene nanoribbon, this region will represent a segment with a maximum degree of annelation, whereas the neighbouring segment preferably has a lower degree of annelation due to partial cyclodehydrogenation in this area.

In the present invention, it is possible that the repeating units of the different graphene segments are derived from the same substituted or unsubstituted polycyclic aromatic monomer compounds and/or oligo phenylene aromatic hydrocarbon monomer compounds, but differ in the degree of annelation of aromatic rings (i.e. the degree of cyclodehydrogenation). Due to the different degree of cyclodehydrogenation in the different graphene segments, the widths of these segments are then preferably different as well.

In the present invention, it is also possible that the different repeating units and therefore the different segments have the same degree of annelation (e.g. complete cyclodehydrogenation in these segments) but differ in segment width. This can be accomplished by using different polycyclic aromatic monomer compounds and/or oligo phenylene aromatic hydrocarbon monomer compounds, or by fusing together two precursor graphene nanoribbons over a localized area (e.g. via annelation of peripheral aromatic rings of neighbouring graphene nanoribbons which are at least partly in parallel orientation to each other) which then represents the segment of higher width in the final segmented graphene nanoribbon, as will be explained below in further detail.

In the present invention, it is also possible that the repeating units of the different segments differ in the substituents attached thereto, whereas the degree of cyclodehydrogenation can be the same or may be different. This can be accomplished by using polycyclic aromatic monomer compounds and/or oligo phenylene aromatic hydrocarbon monomer compounds which have different substituents attached to the aromatic ring(s).

Preferably, each of the segments of the segmented graphene nanoribbon has a length of from 0.25 to 250 nm, more preferably from 1 to 50 nm, and/or the total length of the segmented graphene nanoribbon is preferably at least 4 nm, more preferably at least 20 nm and can be up to 1000 nm, more preferably up to 300 nm. Segment length and length of graphene nanoribbons are measured with scanning tunneling microscopy (STM).

In a preferred embodiment, all segments of the segmented graphene nanoribbon are in a linear arrangement.

To provide such a linear arrangement, each segment of the segmented graphene nanoribbon can be covalently linked to up to two neighbouring segments.

Within the present invention, it is also possible that at least one segment of the segmented graphene nanoribbon is covalently linked to at least three neighbouring segments. Exemplary embodiments are described below in further detail, see e.g. the structure shown in Formula XI.

In a preferred embodiment, the two or more different segments have repeating units which are derived from substituted or unsubstituted anthracene monomer compounds.

Preferably, the segmented graphene nanoribbon comprising the two or more graphene segments having anthracene-based repeating units has the following structure Ia:

X, independently of each other, are H, halogen, SH, $SR_3$, OH, $OR_3$, $OSO_2R_3$, $(SO)R_3$, $(SO_2)R_3$, $NR_1R_2$, $NO_2$, $POR_3R_3$, $PO(OR_3)R_3$, $PO(OR_3)_2$, $B(R_3)_2$, $B(OR_3)_2$, $(CO)R_3$, $(CO)OR_3$, preferably H or halogen, more preferably H;

Y, independently of each other, are H or two Y together form a direct bond between neighbouring repeating units;

R, independently of each other, are hydrogen; linear or branched or cyclic $C_1$-$C_{12}$alkyl which is unsubstituted or substituted by one or more OH, $C_1$-$C_4$alkoxy, phenyl, or by CN; $C_2$-$C_{12}$alkyl which is interrupted by one or more non-consecutive O; halogen; OH; $OR_3$; $SR_3$; CN; $NO_2$; $NR_1R_2$; $(CO)R_3$; $(CO)OR_3$; $O(CO)OR_3$; $O(CO)NR_1R_2$; $O(CO)R_3$; $C_1$-$C_{12}$alkoxy; $C_1$-$C_{12}$alkylthio; $(C_1$-$C_6$alkyl)-$NR_7R_8$; or —O—$(C_1$-$C_6$alkyl)$NR_1R_2$; aryl or heteroaryl (wherein aryl is preferably phenyl, biphenyl, naphthyl, or anthryl all of which are unsubstituted or are substituted by one or more $C_1$-$C_4$-alkyl, CN, $OR_3$, $SR_3$, $CH_2OR_3$, $(CO)OR_3$, $(CO)NR_1R_2$ or halogen);

or two R together with the carbon atoms they are attached to form a 5-8-membered cycle or heterocycle;

$R_1$ and $R_2$ independently of each other are hydrogen, linear or branched $C_1$-$C_6$alkyl or phenyl, or $R_1$ and $R_2$ together with the nitrogen atom to which they are bonded form a group selected from

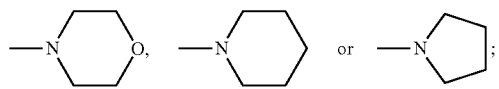

$R_3$ is H, $C_1$-$C_{12}$alkyl, phenyl which is unsubstituted or is substituted by one or more $C_1$-$C_4$alkyl, phenyl, halogen, $C_1$-$C_4$alkoxy or $C_1$-$C_4$alkylthio.

As indicated above, a is preferably 1 to 50. More preferably, a is 1 to 10, even more preferably 1 to 5. If 2≤a≤l (wherein l is preferably 50, more preferably 10, even more

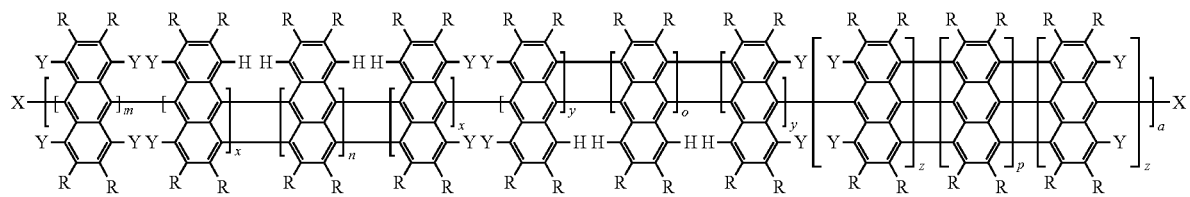

m = 0-1000
x = 0 or 1
n = 0 if x = 0
n = 0-1000 if x = 1
y = 0 or 1
o = 0 if y = 0
o = 0-1000 if y = 1
z = 0 or 1
p = 0 if z = 0
p = 0-1000 if z = 1
a = 1-50 under the provision that at least two of m, x, n, y, o, z, and p are ≥1, and m+x+n+y+o+z+p≥10, more preferably 2500≥m+x+n+y+o+z+p≥50, and wherein preferably 5, as indicated above), the segmented graphene nanoribbon comprises 1 structural parts $a_1$, $a_2$, . . . , $a_l$.

In another preferred embodiment, the segmented graphene nanoribbon comprising the two or more segments having anthracene-based repeating units has the following structure Ib:

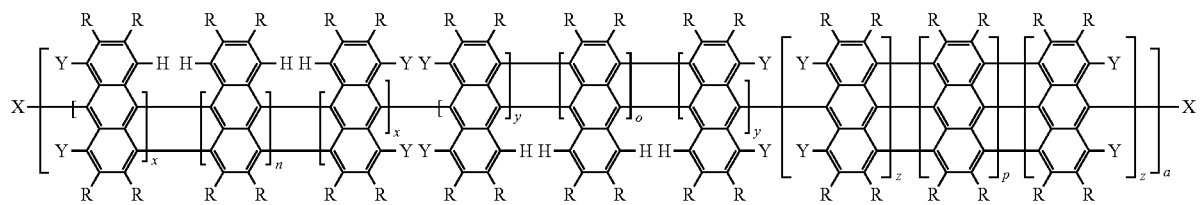

Ib x = 0 or 1
n = 0 if x = 0
n = 0-1000 if x = 1
y = 0 or 1
o = 0 if y = 0
o = 0-1000 if y = 1
z = 0 or 1
p = 0 if z = 0
p = 0-1000 if z = 1
a = 1-50 under the provision that at least two of x, n, y, o, z, and p are ≥1, and x+n+y+o+z+p≥10, more preferably 2500≥x+n+y+o+z+p≥50, and wherein X, Y, and R are the same as defined above for formula Ia.

As indicated above, a is preferably 1 to 50. More preferably, a is 1 to 10, even more preferably 1 to 5. If 2≤a≤l (wherein l is preferably 50, more preferably 10, even more preferably 5, as indicated above), the segmented graphene nanoribbon comprises l structural parts $a_1, a_2, \ldots, a_l$.

In another preferred embodiment, the segmented graphene nanoribbon comprising the two or more segments having anthracene-based repeating units has the following structure Ic:

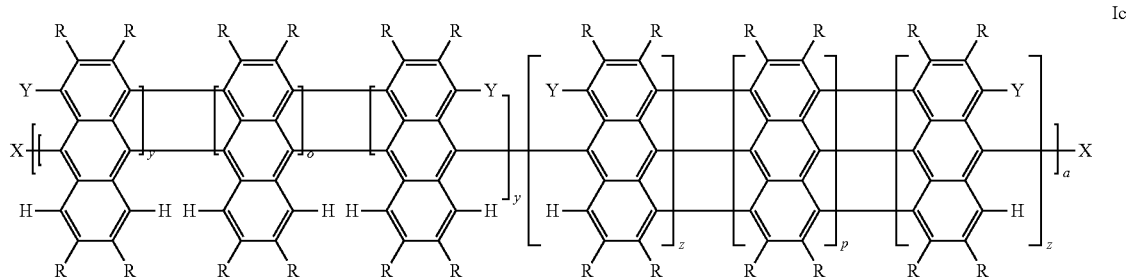

Ic y = 0 or 1
o = 0 if y = 0
o = 0-1000 if y = 1
z = 0 or 1
p = 0 if z = 0
p = 0-1000 if z = 1
a = 1-50 under the provision that at least two of y, o, z, and p are ≥1, and
y+o+z+p≥10, more preferably 2500≥y+o+z+p≥50,
and wherein
X, Y, and R are the same as defined above for formula Ia.

As indicated above, a is preferably 1 to 50. More preferably, a is 1 to 10, even more preferably 1 to 5. If 2≤a≤l (wherein l is preferably 50, more preferably 10, even more preferably 5, as indicated above), the segmented graphene nanoribbon comprises l structural parts $a_1, a_2, \ldots, a_l$.

In another preferred embodiment, the segmented graphene nanoribbon comprising the two or more segments having anthracene-based repeating units has the following structure Id:

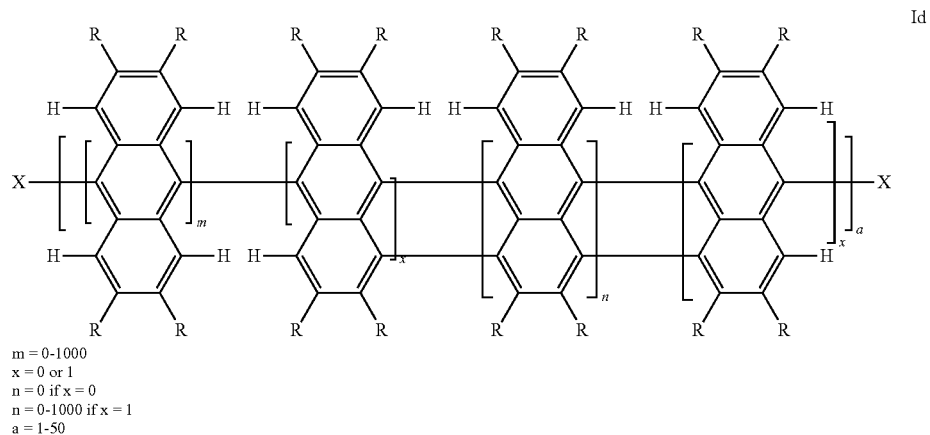

m = 0-1000
x = 0 or 1
n = 0 if x = 0
n = 0-1000 if x = 1
a = 1-50 under the provision that at least two of m, x, and n are ≥1, and
m+x+n≥10, more preferably 2500≥m+x+n≥50,
and wherein
X and R are the same as defined above for formula Ia.

As indicated above, a is preferably 1 to 50. More preferably, a is 1 to 10, even more preferably 1 to 5. If 2≤a≤l (wherein l is preferably 50, more preferably 10, even more preferably 5, as indicated above), the segmented graphene nanoribbon comprises l structural parts $a_1, a_2, \ldots, a_l$.

In another preferred embodiment, the segmented graphene nanoribbon comprising the two or more segments having anthracene-based repeating units has the following structure Ie:

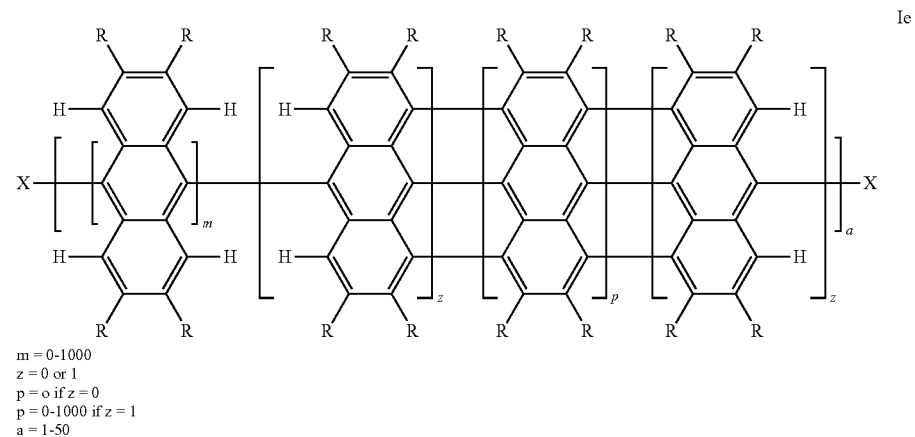

m = 0-1000
z = 0 or 1
p = o if z = 0
p = 0-1000 if z = 1
a = 1-50 under the provision that at least two of m, z, and p are ≥1, wherein m+z+p≥10, more preferably 2500≥m+z+p≥50, and wherein
X and R are the same as defined above for formula Ia.

As indicated above, a is preferably 1 to 50. More preferably, a is 1 to 10, even more preferably 1 to 5. If 2≤a≤l (wherein l is preferably 50, more preferably 10, even more preferably 5, as indicated above), the segmented graphene nanoribbon comprises l structural parts $a_1, a_2, \ldots, a_l$.

In another preferred embodiment, the segmented graphene nanoribbon comprising the two or more segments having anthracene-based repeating units has the following structure Ih:

As indicated above, a is preferably 1 to 50. More preferably, a is 1 to 10, even more preferably 1 to 5. If 2≤a≤l (wherein l is preferably 50, more preferably 10, even more preferably 5, as indicated above), the segmented graphene nanoribbon comprises l structural parts $a_1, a_2, \ldots, a_l$.

The two or more different graphene segments may also have repeating units which are derived from substituted or unsubstituted pentacene monomer compounds.

In a preferred embodiment, the segmented graphene nanoribbon comprising the two or more different segments having repeating units derived from pentacene monomer compounds has the following structure II:

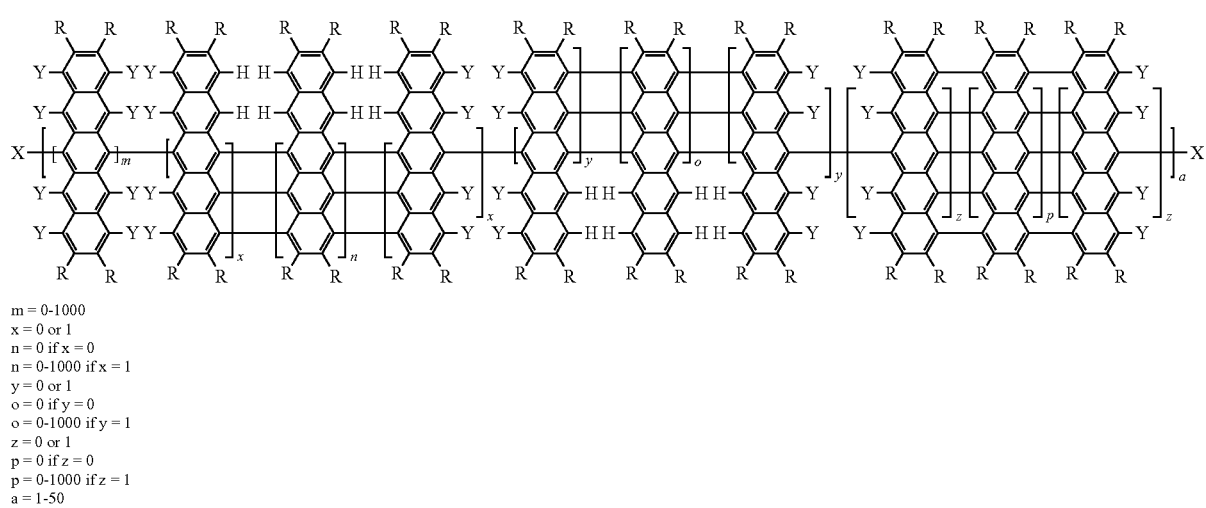

II

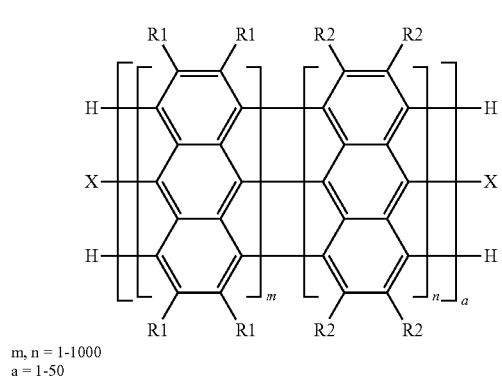

Ih m, n = 1-1000
a = 1-50 wherein
m+n≥10, more preferably 2500≥m+n≥50,
and wherein
R1 and R2 are the same as R defined above with the provision that R1 is different from R2, and
X is the same as defined above.

under the provision that at least two of m, x, n, y, o, z, and p are ≥1, and m+x+n+y+o+z+p≥10, more preferably 2500≥m+x+n+y+o+z+p≥50, and wherein X, Y and R have the same meaning as defined above for formula Ia.

As indicated above, a is preferably 1 to 50. More preferably, a is 1 to 10, even more preferably 1 to 5. If 2≤a≤l (wherein l is preferably 50, more preferably 10, even more preferably 5, as indicated above), the segmented graphene nanoribbon comprises l structural parts $a_1, a_2, \ldots, a_l$.

According to another preferred embodiment, the segmented graphene nanoribbon comprising the two or more different segments having repeating units derived from pentacene monomer compounds has the following structure III:

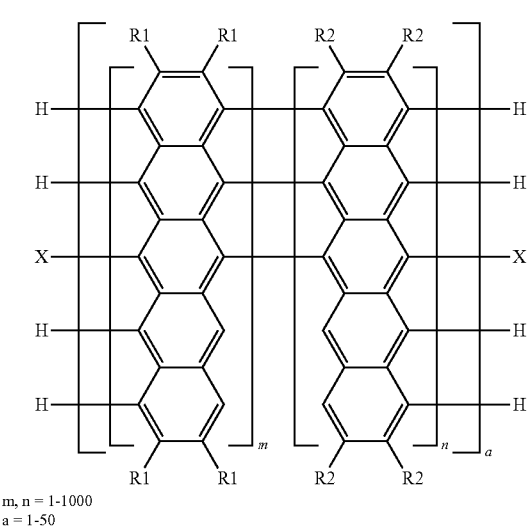

m, n = 1-1000
a = 1-50 wherein m+n≥10, more preferably 2500≥m+n≥50,
and wherein

R1 and R2 are the same as R defined above with the proviso that R1 is different from R2, and
X is the same as defined above.

As indicated above, a is preferably 1 to 50. More preferably, a is 1 to 10, even more preferably 1 to 5. If 2≤a≤1 (wherein 1 is preferably 50, more preferably 10, even more preferably 5, as indicated above), the segmented graphene nanoribbon comprises 1 structural parts $a_1, a_2, \ldots, a_l$.

In the present invention, it is also possible that the two or more different graphene segments have repeating units which are derived from substituted or unsubstituted anthracene and substituted or unsubstituted pentacene monomer compounds.

According to a preferred embodiment, the segmented graphene nanoribbon comprising the two or more different segments having repeating units derived from anthracene and pentacene monomer compounds has the following structure IV:

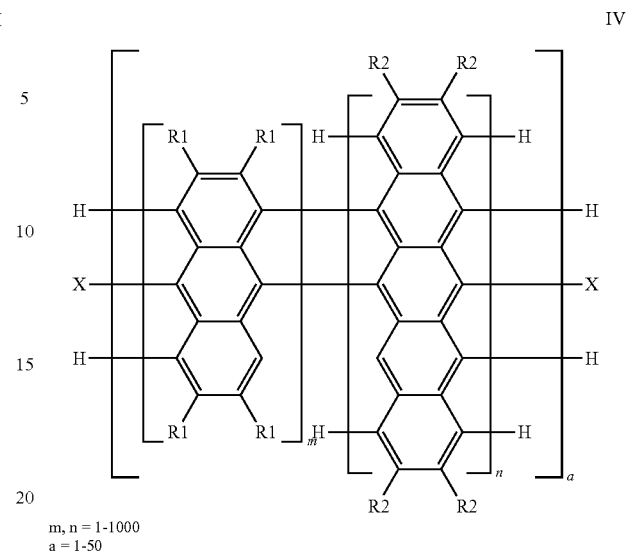

m, n = 1-1000
a = 1-50 wherein
m+n≥10, more preferably 2500≥m+n≥50,
and wherein
R1 and R2 are the same as R defined above with the provision that R1 is different from R2, and
X is the same as defined above.

As indicated above, a is preferably 1 to 50. More preferably, a is 1 to 10, even more preferably 1 to 5. If 2≤a≤1 (wherein 1 is preferably 50, more preferably 10, even more preferably 5, as indicated above), the segmented graphene nanoribbon comprises 1 structural parts $a_1, a_2, \ldots, a_l$.

The two or more different graphene segments can also have repeating units derived from substituted and/or unsubstituted naphthalene monomer compounds.

In a preferred embodiment, the segmented graphene nanoribbon comprising the two or more different segments having repeating units which are derived from naphthalene monomer compounds has the following structure V:

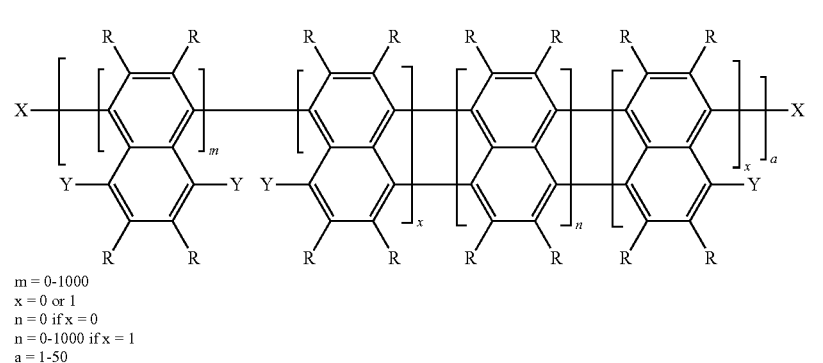

m = 0-1000
x = 0 or 1
n = 0 if x = 0
n = 0-1000 if x = 1
a = 1-50 under the provision that at least two of m, x, and n are ≥1, and
m+x+n are ≥10, more preferably 2500≥m+x+n≥50,
and wherein X, Y, and R have the same meaning as indicated above.

As indicated above, a is preferably 1 to 50. More preferably, a is 1 to 10, even more preferably 1 to 5. If 2≤a≤1 (wherein 1 is preferably 50, more preferably 10, even more preferably 5, as indicated above), the segmented graphene nanoribbon comprises 1 structural parts $a_1, a_2, \ldots, a_l$.

In another preferred embodiment, the segmented graphene nanoribbon comprising the two or more different segments having repeating units which are derived from naphthalene monomer compounds has the following structure VI:

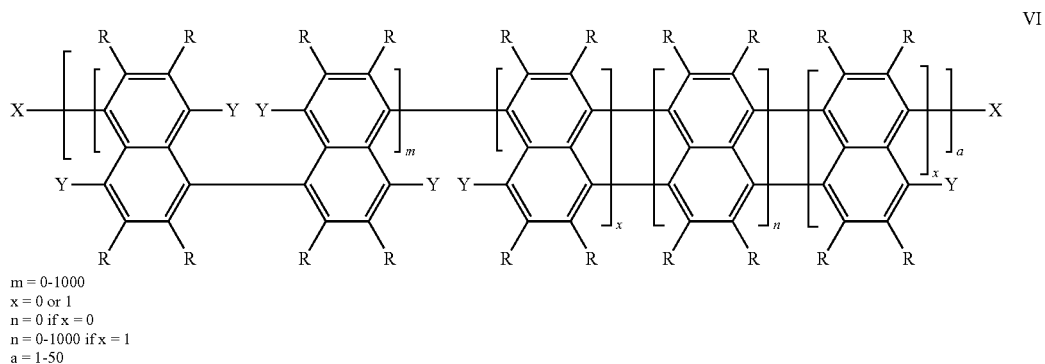

m = 0-1000
x = 0 or 1
n = 0 if x = 0
n = 0-1000 if x = 1
a = 1-50 under the provision that at least two of m, x, and n are ≥1, and
m+x+n are ≥10, more preferably 2500≥m+x+n≥35,
and wherein X, Y, and R have the same meaning as indicated above.

As indicated above, a is preferably 1 to 50. More preferably, a is 1 to 10, even more preferably 1 to 5. If 2≤a≤l (wherein l is preferably 50, more preferably 10, even more preferably 5, as indicated above), the segmented graphene nanoribbon comprises 1 structural parts $a_1, a_2, \ldots, a_l$.

In another preferred embodiment, the segmented graphene nanoribbon comprising the two or more different segments having repeating units which are derived from naphthalene monomer compounds has the following structure VII:

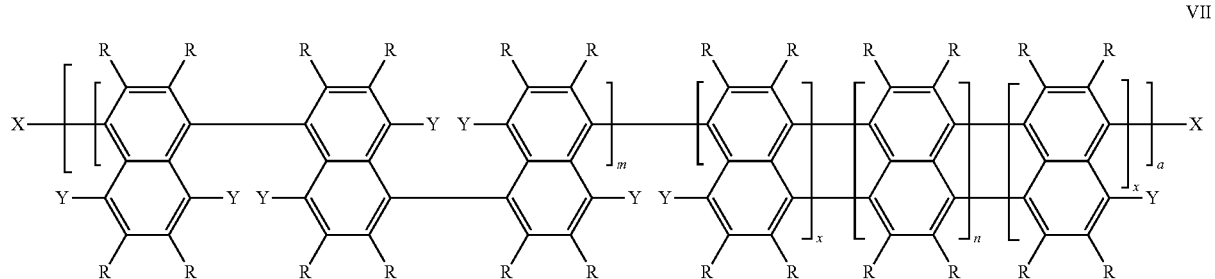

m = 0-650
x = 0 or 1
n = 0 if x = 0
n = 0-1000 if x = 1
a = 1-50 under the provision that at least two of m, x, and n are ≥1, and
m+x+n are ≥10, more preferably 2500≥m+x+n≥30,
and wherein X, Y, and R have the same meaning as indicated above.

As indicated above, a is preferably 1 to 50. More preferably, a is 1 to 10, even more preferably 1 to 5. If 2≤a≤1 (wherein 1 is preferably 50, more preferably 10, even more preferably 5, as indicated above), the segmented graphene nanoribbon comprises 1 structural parts $a_1, a_2, \ldots, a_l$.

In another preferred embodiment, the segmented graphene nanoribbon comprising the two or more different segments having repeating units which are derived from naphthalene monomer compounds has the following structure VIII:

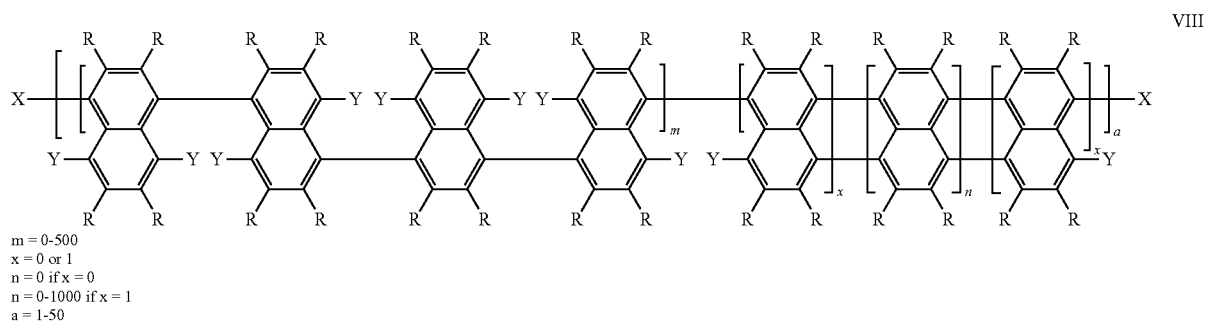

m = 0-500
x = 0 or 1
n = 0 if x = 0
n = 0-1000 if x = 1
a = 1-50 under the provision that at least two of m, x, and n are ≥1, and
m+x+n are ≥10, more preferably 2500≥m+x+n≥25,
and wherein X, Y, and R have the same meaning as indicated above.

As indicated above, a is preferably 1 to 50. More preferably, a is 1 to 10, even more preferably 1 to 5. If 2≤a≤1 (wherein 1 is preferably 50, more preferably 10, even more preferably 5, as indicated above), the segmented graphene nanoribbon comprises 1 structural parts $a_1, a_2, \ldots, a_l$.

In another preferred embodiment, the segmented graphene nanoribbon comprising the two or more different segments having repeating units which are derived from naphthalene monomer compounds has the following structure IX:

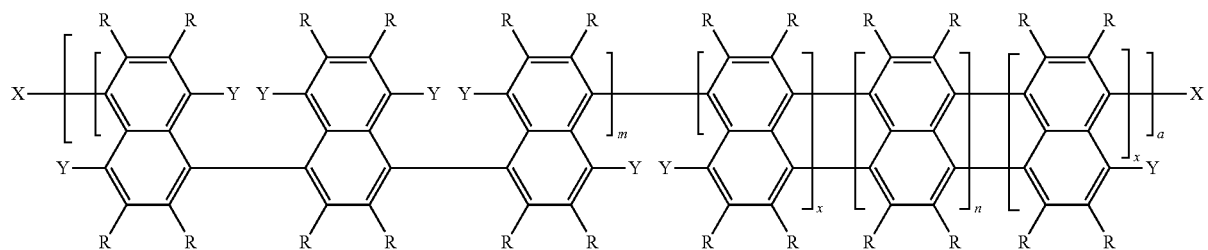

m = 0-650
x = 0 or 1
n = 0 if x = 0
n = 0-1000 if x = 1
a = 1-50 under the provision that at least two of m, x, and n are ≥1, and
m+x+n are ≥10, more preferably 2500≥m+x+n≥30, and wherein X, Y, and R have the same meaning as indicated above.

As indicated above, a is preferably 1 to 50. More preferably, a is 1 to 10, even more preferably 1 to 5. If 2≤a≤1 (wherein 1 is preferably 50, more preferably 10, even more preferably 5, as indicated above), the segmented graphene nanoribbon comprises 1 structural parts $a_1, a_2, \ldots, a_l$.

In another preferred embodiment, the segmented graphene nanoribbon comprising the two or more different segments having repeating units which are derived from naphthalene monomer compounds has the following structure X:

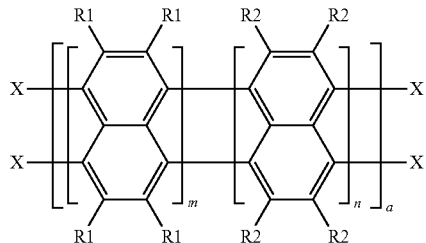

m, n = 1-1000
a = 1-50

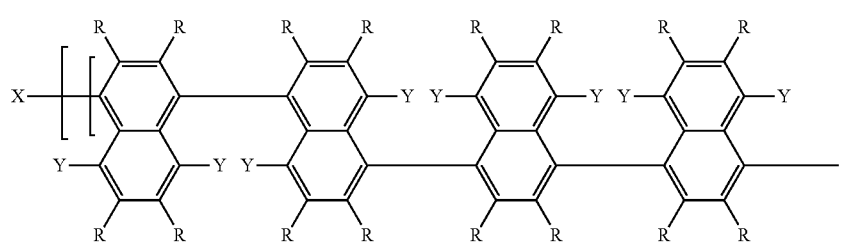

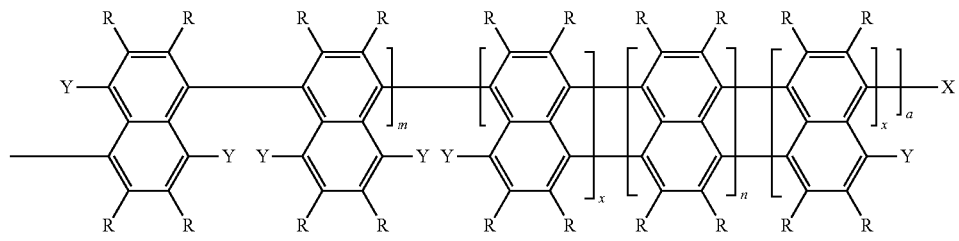

m = 0-350
x = 0 or 1
n = 0 if x = 0
n = 0-1000 if x = 1
a = 1-50 under the provision that at least two of m, x, and n are ≥1, and m+x+n are ≥10, more preferably 2500≥m+x+n≥20, and wherein X, Y, and R have the same meaning as indicated above.

As indicated above, a is preferably 1 to 50. More preferably, a is 1 to 10, even more preferably 1 to 5. If 2≤a≤1 (wherein 1 is preferably 50, more preferably 10, even more preferably 5, as indicated above), the segmented graphene nanoribbon comprises 1 structural parts $a_1, a_2, \ldots, a_l$.

In another preferred embodiment, the segmented graphene nanoribbon comprising the two or more different segments having repeating units which are derived from naphthalene monomer compounds has the following structure XIII:

wherein
m+n≥10, more preferably 2500≥m+n≥50,
and wherein
R1 and R2 are the same as R defined above with the provision that R1 is different from R2, and
X is the same as defined above.

As indicated above, a is preferably 1 to 50. More preferably, a is 1 to 10, even more preferably 1 to 5. If 2≤a≤1 (wherein 1 is preferably 50, more preferably 10, even more preferably 5, as indicated above), the segmented graphene nanoribbon comprises 1 structural parts $a_1, a_2, \ldots, a_l$.

Within the present invention, it is possible that at least one of the graphene segments has a substituted or unsubstituted repeating unit with N1 dimer lines across the segment width, and at least one of the graphene segments has a repeating unit with N2 dimer lines across the segment width, wherein N1=5 to 13 (more preferably N1=5, 7, or 11), and N2=k×N1, with k=2, 3, or 4 (more preferably 2 or 3).

In a preferred embodiment, the segmented graphene nanoribbon comprises at least one segment having a repeating unit with N1=5 and at least one segment having a repeating unit with N2=10, 15, or 20 (where N1 and N2 are the numbers of dimer lines counted across the segment width).

Preferably, the segmented graphene nanoribbon comprising at least one segment having a substituted or unsubstituted repeating unit with N1=5 and at least one segment having a substituted or unsubstituted repeating unit with N2=10 and/or N2=15, has the chemical structure XI as shown below:

preferably 5, as indicated above), the segmented graphene nanoribbon comprises 1 structural parts $a_1, a_2, \ldots, a_l$.

In another preferred embodiment, the segmented graphene nanoribbon comprising at least one segment having a substituted or unsubstituted repeating unit with N1=5 and at least one segment having a substituted or unsubstituted repeating unit with N2=10 has the chemical structure XII as shown below:

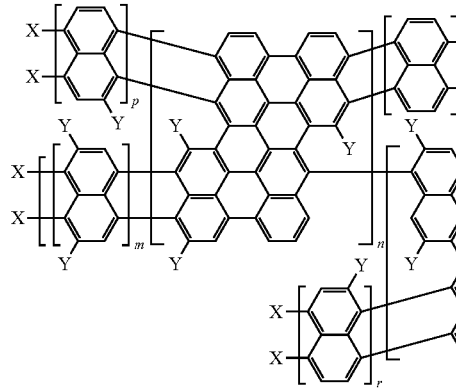
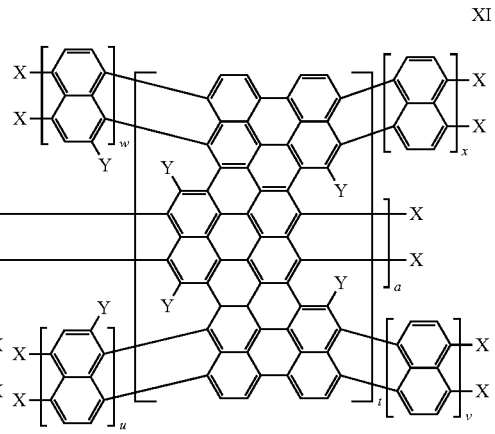

m, n, o, p, q, r, s, t, u, v, w, x = 0-1000
a = 1-50

XI under the proviso that at least one, or at least two, or at least three of m, p, q, r, s, u, v, w, and x is are ≥1, and at least one of n, o, and t is ≥1,
and m+n+o+p+q+r+s+t+u+v+w+x≥10,
more preferably 2500≥m+n+o+p+q+r+s+t+u+v+w+x≥25,
and wherein X and Y have the same meaning as indicated above.

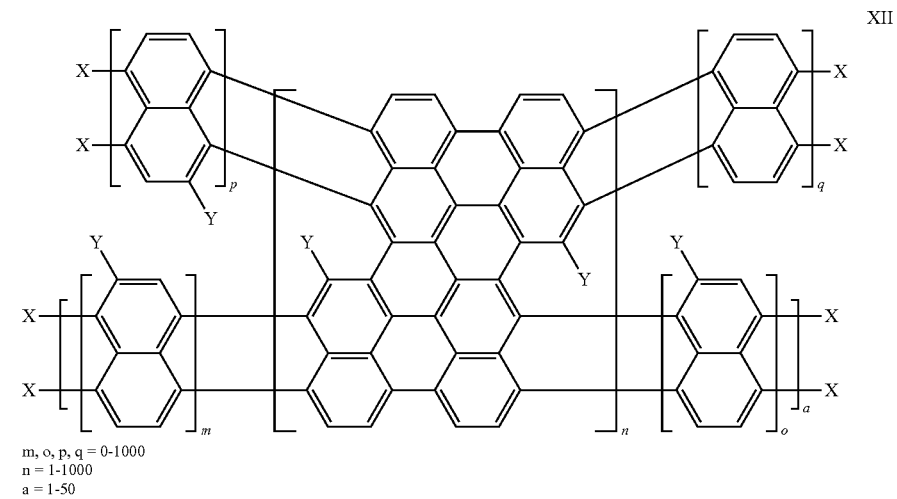

m, o, p, q = 0-1000
n = 1-1000
a = 1-50

XII

Preferably, at least one of n, o, and t is ≥1, and at least two of m, p, q, r, s, u, v, w, and x are ≥1 such that at least one of the graphene segments is covalently linked to two or more neighbouring segments.

As indicated above, a is preferably 1 to 50. More preferably, a is 1 to 10, even more preferably 1 to 5. If 2≤a≤l (wherein l is preferably 50, more preferably 10, even more under the proviso that at least one, or at least two, or at least three or even all of p, m, q, and o is are ≥1;

and m+n+o+p+q≥10, more preferably 2500≥m+n+o+p+q≥25,
and wherein X and Y have the same meaning as indicated above.

As indicated above, a is preferably 1 to 50. More preferably, a is 1 to 10, even more preferably 1 to 5. If $2 \leq a \leq l$ (wherein l is preferably 50, more preferably 10, even more preferably 5, as indicated above), the segmented graphene nanoribbon comprises l structural parts $a_1, a_2, \ldots, a_l$.

According to another preferred embodiment, the segmented graphene nanoribbon comprises at least one segment having a substituted or unsubstituted repeating unit with N1=7 and at least one segment having a substituted or unsubstituted repeating unit with N2=14 and/or 21.

In a preferred embodiment, the segmented graphene nanoribbon comprising at least one segment having a substituted or unsubstituted repeating unit with N1=7 and at least one segment having a substituted or unsubstituted repeating unit with N2=14 and/or 21, has the chemical structure If as shown below.

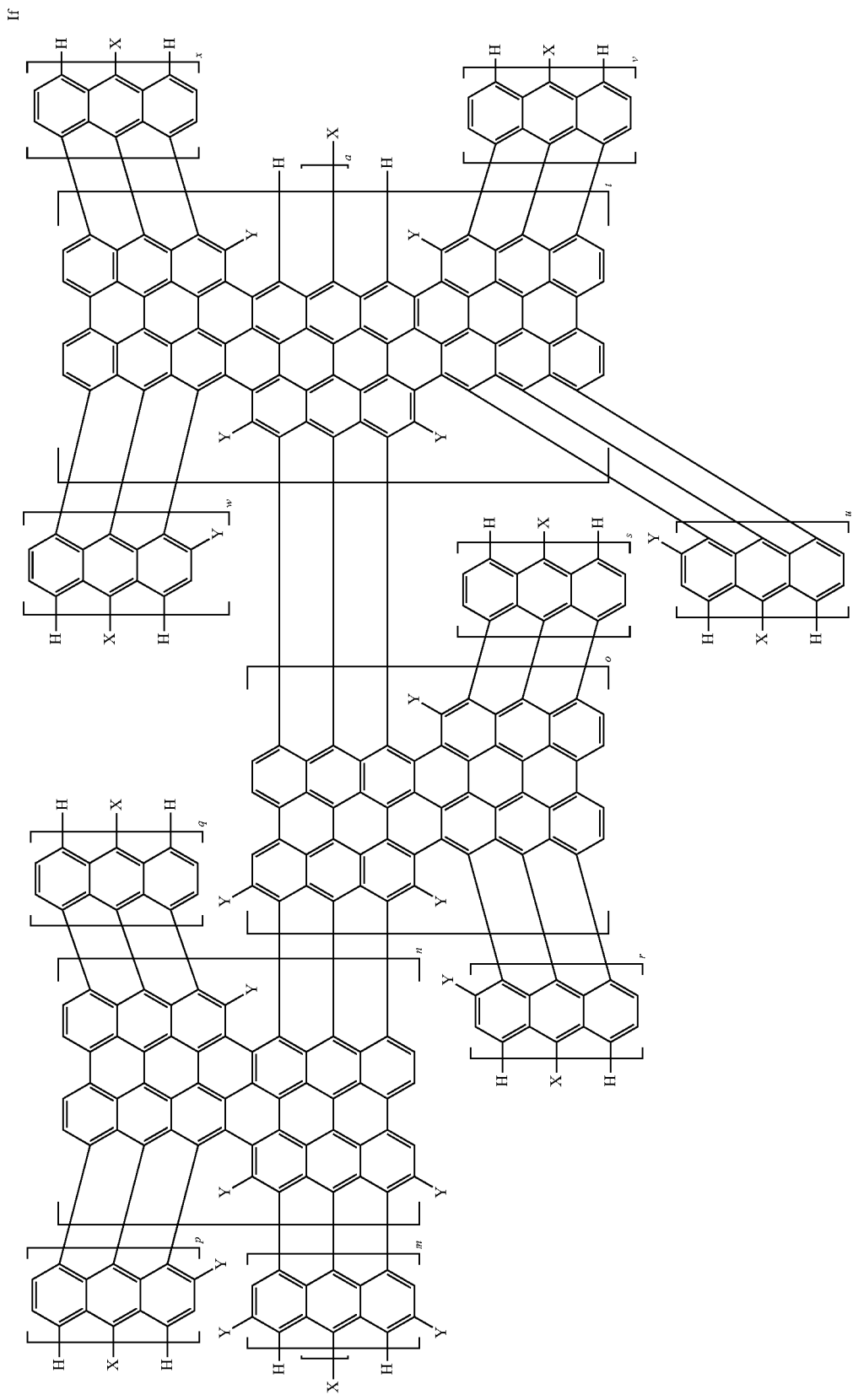

under the proviso that at least one, or at least two, or at least three of m, p, q, w, x, r, s, u, and v are ≥1, and at least one of n, o, and t are ≥1, and
m+n+o+p+q+r+s+t+u+v+w+x≥10,
more preferably 2500≥m+n+o+p+q+r+s+t+u+v+w+x≥25, and X and Y have the same meaning as indicated above.

Preferably, at least one of n, o, and t is ≥1, and at least two of m, p, q, r, s, u, v, w, and x are ≥1 such that at least one of the graphene segments is covalently linked to two or more neighbouring graphene segments.

As indicated above, a is preferably 1 to 50. More preferably, a is 1 to 10, even more preferably 1 to 5. If 2≤a≤l (wherein l is preferably 50, more preferably 10, even more preferably 5, as indicated above), the segmented graphene nanoribbon comprises l structural parts $a_1, a_2, \ldots, a_l$.

In a preferred embodiment, the segmented graphene nanoribbon comprising at least one segment having a substituted or unsubstituted repeating unit with N1=7 and at least one segment having a substituted or unsubstituted repeating unit with N2=14 has the chemical structure Ig as shown below.

(a) depositing at least one polycyclic aromatic monomer compound and/or oligo phenylene aromatic hydrocarbon monomer compound on a solid substrate, (b) polymerization of the polycyclic aromatic and/or oligo phenylene aromatic hydrocarbon monomer compound so as to form at least one polymer, which is preferably linear, on the surface of the solid substrate, (c) at least partially cyclodehydrogenating the one or more polymers of step (b).

The polycyclic aromatic monomer compound, preferably polycyclic aromatic hydrocarbon monomer compound, and/or the oligo phenylene aromatic hydrocarbon monomer compound of step (a) can be any compound which undergoes polymerization to a polymer (preferably a linear polymer) under appropriate reaction conditions. Such polycyclic aromatic monomer or oligo phenylene aromatic hydrocarbon monomer compounds that can be reacted to a polymer are generally known to the skilled person.

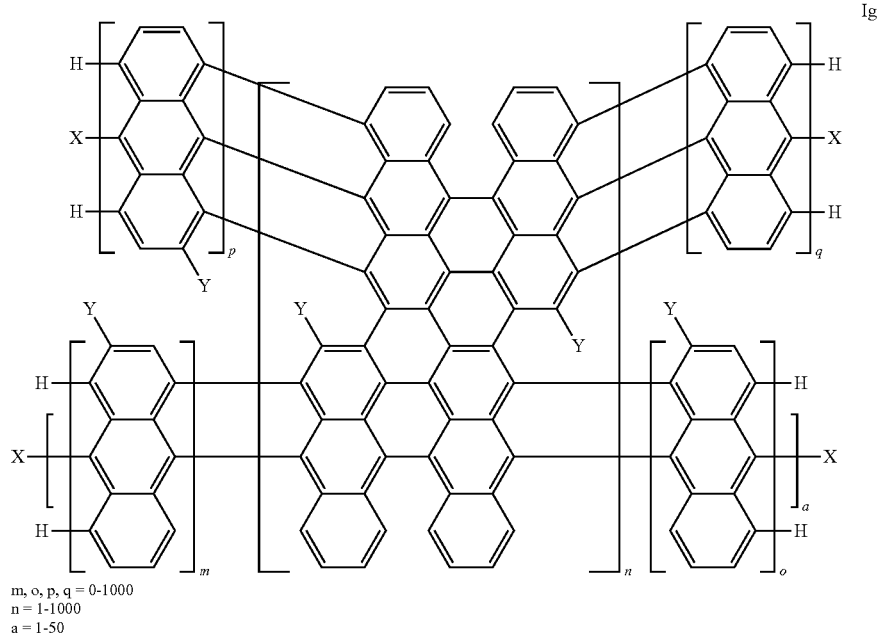

m, o, p, q = 0-1000
n = 1-1000
a = 1-50 under the proviso that at least one, or at least two or at least three or even all of m, p, q, and o are ≥1,
wherein m+n+o+p+q+r+s+t+u+v+w+x≥10,
more preferably 2500≥m+n+o+p+q+r+s+t+u+v+w+x≥25,
wherein X and Y have the same meaning as indicated above.

As indicated above, a is preferably 1 to 50. More preferably, a is 1 to 10, even more preferably 1 to 5. If 2≤a≤l (wherein l is preferably 50, more preferably 10, even more preferably 5, as indicated above), the segmented graphene nanoribbon comprises l structural parts $a_1, a_2, \ldots, a_l$.

Preferably, the segmented graphene nanoribbon includes at least one heterojunction.

A heterojunction is generated at the interface of two covalently linked graphene segments which differ in their electronic properties (e.g. different band gaps).

According to another aspect, the present invention provides a process for preparing the segmented graphene nanoribbon as defined above, which comprises:

Preferably, the polycyclic aromatic monomer and/or oligo phenylene aromatic hydrocarbon monomer compound is substituted with at least two leaving groups, more preferably has at least two halogen substituents, preferably Br and/or I, which provide reactive sites for a subsequent polymerization reaction.

The polycyclic aromatic monomer compound can for instance be an anthracene based compound such as those of formulae 1-3 shown below, a bisanthene based compound such as the one of formula 4 shown below, or a trisanthene based compound such as the one of formula 5 shown below. A variety of such compounds is commercially available or can be prepared according to literature procedures by those skilled in the art. Reference can also be made to those polycyclic aromatic monomer compounds already mentioned above when discussing compounds from which the graphene segment repeating units are derived.

1

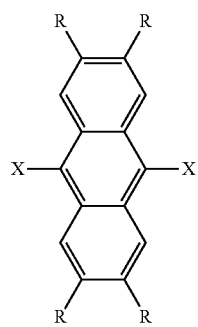

2

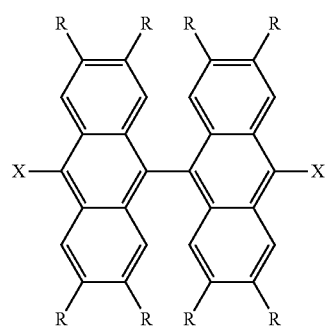

3

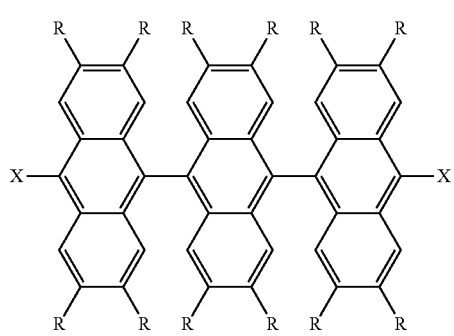

4

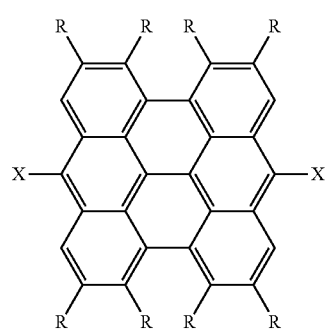

5

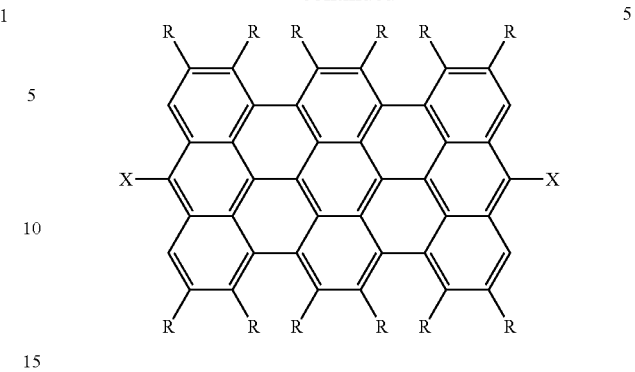

In formulae 1 to 5, it is preferred that

X, independently from each other, are a leaving group, preferably Br or I;

R, independently of each other, are hydrogen; linear or branched or cyclic $C_1$-$C_{12}$alkyl which is unsubstituted or substituted by one or more OH, $C_1$-$C_4$alkoxy, phenyl, or by CN; $C_2$-$C_{12}$alkyl which is interrupted by one or more non-consecutive O; halogen; OH; $OR_3$; $SR_3$; CN; $NO_2$; $NR_1R_2$; (CO)$R_3$; (CO)$OR_3$; O(CO)$OR_3$; O(CO)$NR_1R_2$; O(CO)$R_3$; $C_1$-$C_{12}$alkoxy; $C_1$-$C_{12}$alkylthio; ($C_1$-$C_6$alkyl)-$NR_7R_8$; or —O—($C_1$-$C_6$alkyl)$NR_1R_2$; aryl or heteroaryl (wherein aryl is preferably phenyl, biphenyl, naphthyl, or anthryl all of which are unsubstituted or are substituted by one or more $C_1$-$C_4$-alkyl, CN, $OR_3$, $SR_3$, $CH_2OR_3$, (CO)$OR_3$, (CO)$NR_1R_2$ or halogen);

or two R together with the carbon atoms they are attached to form a 5-8-membered cycle or heterocycle;

$R_1$ and $R_2$ independently of each other are hydrogen, linear or branched $C_1$-$C_6$alkyl or phenyl, or $R_1$ and $R_2$ together with the nitrogen atom to which they are bonded form a group selected from

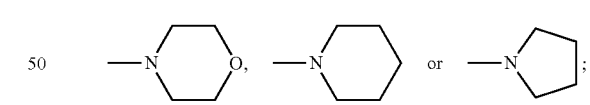

$R_3$ is H, $C_1$-$C_{12}$alkyl, phenyl which is unsubstituted or is substituted by one or more $C_1$-$C_4$alkyl, phenyl, halogen, $C_1$-$C_4$alkoxy or $C_1$-$C_4$alkylthio.

The monomer compound can also be a pentacene based compound such as the compounds of formula 6 and 7. This type of compound can be prepared according to literature procedures by those skilled in the art.

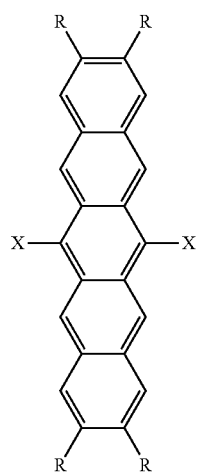

6

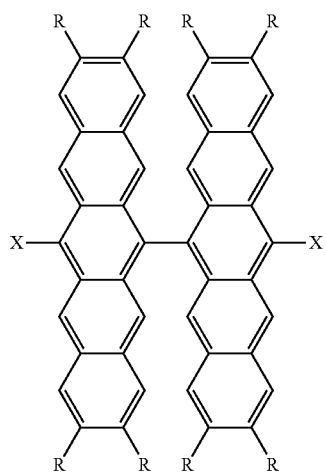

7

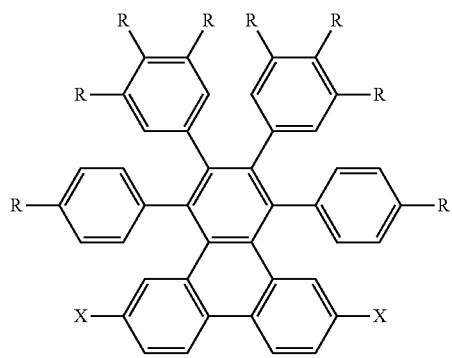

8

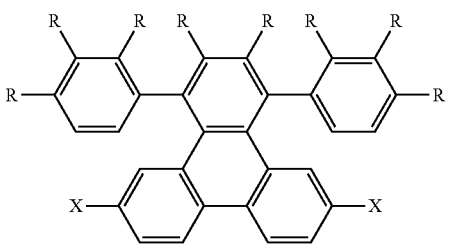

9

X and R have the same meaning as defined above for formulae 1 to 5.

The monomer compound can also be an oligo phenylene aromatic hydrocarbon compound, such as described e.g. in patent applications EP 11 186 716.4 and EP 11 186 659.6, such as compounds 100 to 104 shown below.

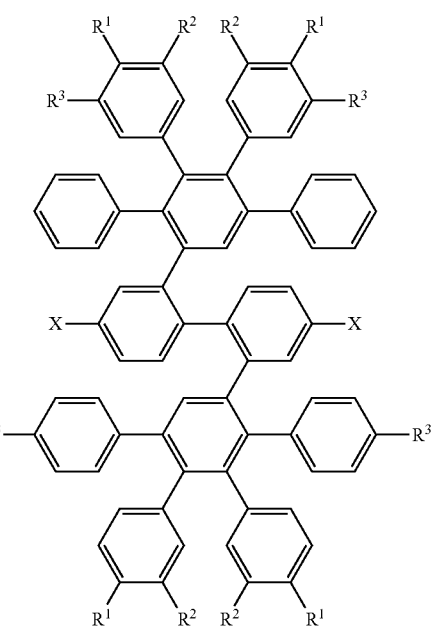

100 wherein
X and R have the same meaning as defined above for formulae 1 to 5.

101

X and R have the same meaning as defined above for formulae 1 to 5.

The monomer compound can also be a phenanthrene based compound such as the compounds of formulae 8 and 9. This type of monomer is described e.g. in U.S. Pat. No. 7,968,872.

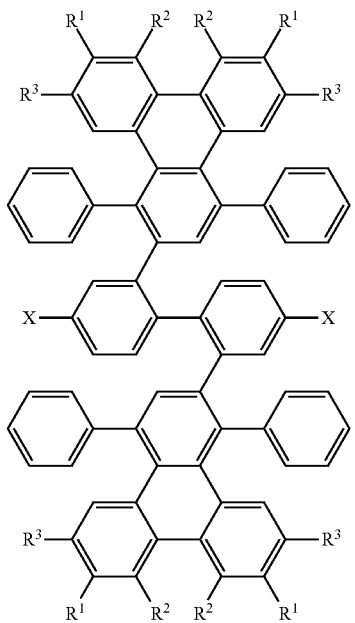

102

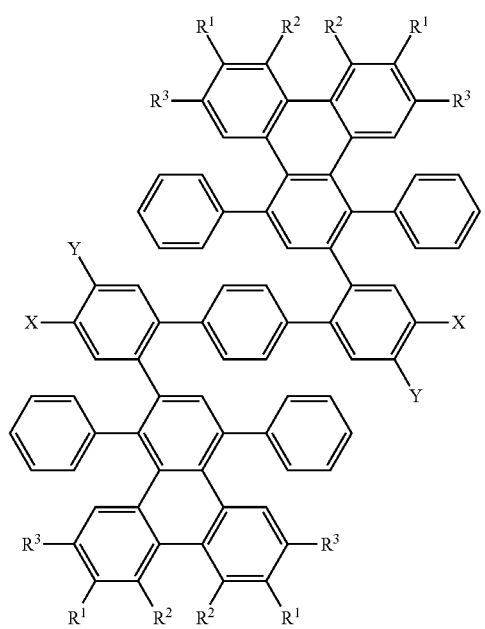

104 wherein

R1, R2, and R3, which can be the same or different, are H, halogen, —OH, —NH$_2$, —CN, —NO$_2$, a linear or branched, saturated or unsaturated C$_1$-C$_{40}$ hydrocarbon residue, which can be substituted 1- to 5-fold with halogen (F, Cl, Br, I), —OH, —NH$_2$, —CN and/or —NO$_2$, and wherein one or more CH$_2$-groups can be replaced by —O—, —S—, —C(O)O—, —O—C(O)—, —C(O)—, —NH— or —NR—, wherein R is an optionally substituted C$_1$-C$_{40}$ hydrocarbon residue, or an optionally substituted aryl, alkylaryl or alkoxyaryl residue, X is halogen.

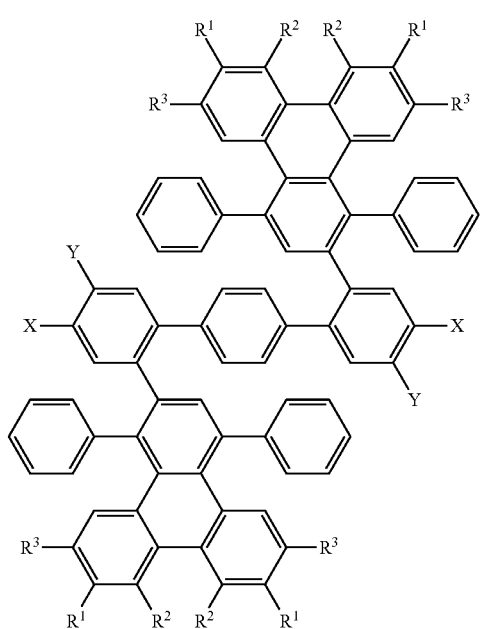

103 wherein

R1, R2, and R3, which can be the same or different, are H, halogen, —OH, —NH$_2$, —CN, —NO$_2$, a linear or branched, saturated or unsaturated C$_1$-C$_{40}$ hydrocarbon residue, which can be substituted 1- to 5-fold with halogen (F, Cl, Br, I), —OH, —NH$_2$, —CN and/or —NO$_2$, and wherein one or more CH$_2$-groups can be replaced by —O—, —S—, —C(O)O—, —O—C(O)—, —C(O)—, —NH— or —NR—, wherein R is an optionally substituted C$_1$-C$_{40}$ hydrocarbon residue, or an optionally substituted aryl, alkylaryl or alkoxyaryl residue, X is halogen and Y is H, or X is H and Y is halogen.

The monomer compound can also be a tetracene based compound such as those of formulae 10-13. This type of compound can be prepared according to literature procedures by those skilled in the art.

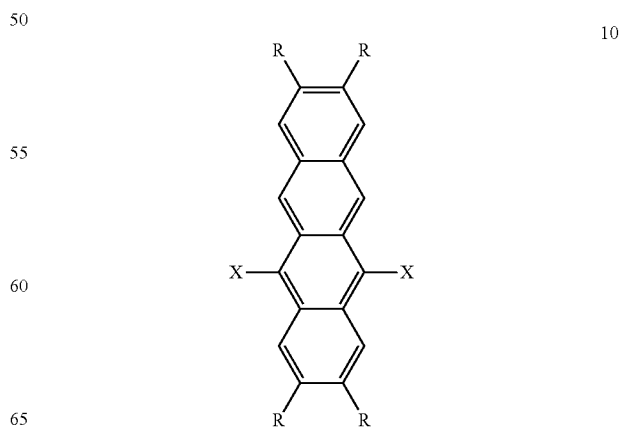

10

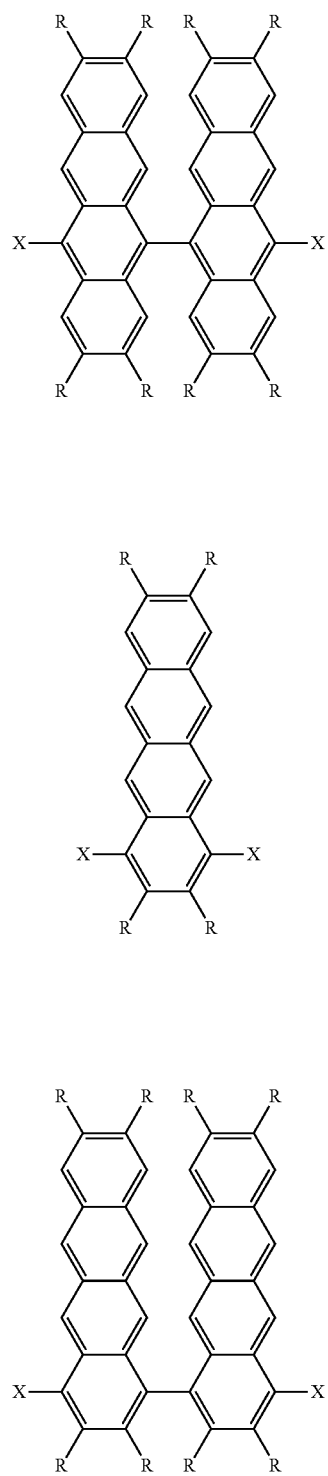
wherein
X and R have the same meaning as defined above for formulae 1 to 5.
The monomer compound can also be a naphthalene based compound such as those of formulae 14 to 22. This type of compound can be prepared according to literature procedures by those skilled in the art.

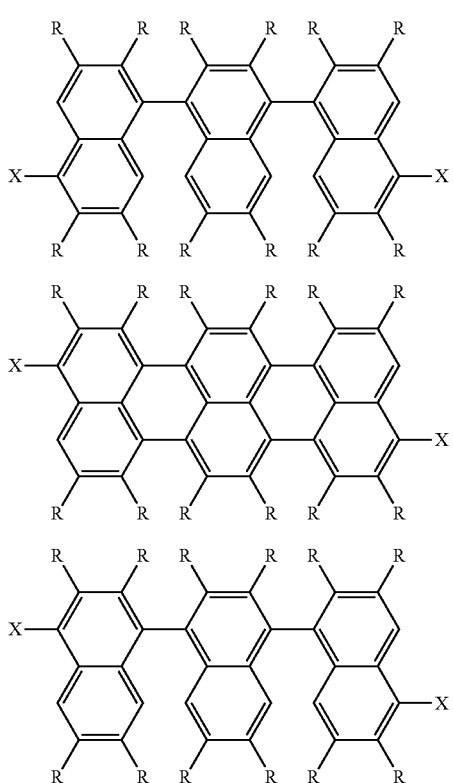

wherein
X and R have the same meaning as defined above for formulae 1 to 5.

As indicated above, step (a) includes depositing the at least one polycyclic aromatic monomer or oligo phenylene aromatic hydrocarbon monomer compound on a solid substrate.

Any solid substrate enabling the deposition of the polycyclic aromatic monomer or oligo phenylene aromatic hydrocarbon monomer compound and subsequent polymerization to a linear polymer on its surface can be used. Preferably, the solid substrate has a flat surface.

The flat surface on which the monomer compound is deposited can be a metal surface such as a Au, Ag, Cu, Al, W, Ni, Pt, or a Pd surface (which may be reconstructed or vicinal), or the surface can be an alloy of these metals. The surface can be completely flat or patterned or stepped. Such patterned or stepped surfaces and manufacturing methods thereof are known to the skilled person. On patterned surfaces the growth of graphene nanoribbons may be directed by the surface pattern.

The surface may also be a metal oxide surface such as silicon oxide, silicon oxynitride, hafnium silicate, nitrided hafnium silicates (HfSiON), zirconium silicate, hafnium dioxide and zirconium dioxide, or aluminium oxide, copper oxide, iron oxide.

The surface may also be made of a semiconducting material such as silicon, germanium, gallium arsenide, silicon carbide, and molybdenum disulfide.

The surface may also be a material such as boron nitride, sodium chloride, or calcite.

The surface may be electrically conducting, semiconducting, or insulating.

The deposition on the surface may be done by any process suitable for deposition of organic compounds on a surface. The process may e.g. be a vacuum deposition (sublimation) process, a solution based process such as spin coating, spray coating, dip coating, printing, or a laser induced desorption process.

Preferably the deposition is done by a vacuum deposition process. Preferably it is a vacuum sublimation process. The vacuum may be in the range of $10^{-3}$ to $10^{-11}$ mbar.

As indicated above, step (b) of the process of the present invention includes polymerization of the polycyclic aromatic monomer and/or oligo phenylene aromatic hydrocarbon monomer compound so as to form at least one polymer, which is preferably linear, on the surface of the solid substrate.

Appropriate conditions for effecting polymerization of the polycyclic aromatic monomer and/or oligo phenylene aromatic hydrocarbon monomer compound are generally known to the skilled person.

Preferably, the polymerization in step (b) is induced by thermal activation. However, any other energy input which induces polymerization of the polycyclic aromatic monomer and/or oligo phenylene aromatic hydrocarbon monomer compound such as radiation can be used as well.

The activation temperature is dependent on the employed surface and the monomer and can be in the range of from 0 to 500° C.

Optionally, step (a) and/or step (b) can be repeated at least once before carrying out partial or complete cyclodehydrogenation in step (c). When repeating steps (a) and (b), the same monomer compound or a different polycyclic aromatic monomer and/or oligo phenylene aromatic hydrocarbon monomer compound can be used.

As indicated above, step (c) of the process of the present invention includes at least partially cyclodehydrogenating the one or more polymers of step (b).

In general, appropriate reaction conditions for cyclodehydrogenation are known to the skilled person.

In a preferred embodiment, the polymer of step (b) is subjected to partial cyclodehydrogenation.

According to this preferred embodiment, reaction conditions are chosen such that complete cyclodehydrogenation is avoided. If there was complete cyclodehydrogenation, each polycyclic aromatic repeating unit would be fully annelated to its neighbouring unit. However, partial cyclodehydrogenation of the polymer of step (b) results in segments within the final graphene nanoribbon which differ in the degree of annelation between neighbouring units. Each segment within the segmented graphene nanoribbon has its specific degree of annelation between neighbouring polycyclic aromatic repeating units. Thus, by using a partial cyclodehydrogenation step, a segmented graphene nanoribbon can be obtained even if just one polycyclic aromatic monomer or oligo phenylene aromatic hydrocarbon monomer compound has been deposited on the solid substrate in step (a).

Preferably, the partial cyclodehydrogenation reaction is induced by thermal activation. The activation temperature is preferably higher than the temperature in the first activation step for inducing polymerisation. The activation temperature for partial cyclodehydrogenation is dependent on the employed surface and polymer precursor and may be in the range of 50-600° C.

In order to allow preparation of segmented graphene nanoribbons, activation temperature and activation time are preferably selected such that completion of the cyclodehydrogenation reaction leading to non-segmented graphene nanoribbons is avoided.

As an example, for precursor polymers derived from dibromo-bisanthryl type monomers of the type of compound 2 on a gold surface, partial cyvlodehydrogenation can be achieved by keeping the temperature around 327° C. (600 K) for around 5 minutes. If the same cyclodehydrogenation on gold is e.g. conducted at 397° C. (670 K) for 10 minutes, complete cyclodehydrogenation is achieved.

According to another preferred embodiment of the present invention, at least two polymers of step (b) are subjected to complete cyclodehydrogenation so as to form a first and second precursor graphene nanoribbons, followed by annelating at least one repeating unit of the first precursor graphene nanoribbon to at least one repeating unit of the second precursor graphene nanoribbon so as to form the segmented graphene nanoribbon.

The area at which the two precursor graphene nanoribbons have been fused together then represents a graphene segment of higher segment width in the final segmented graphene nanoribbon, if compared to a neighbouring segment.

As an example, on a gold surface, the annelation of two neighbouring precursor graphene nanoribbons can be conducted by keeping the temperature at around 437° C. (710 K) for around 5 minutes.

In a preferred embodiment, at least two different polycyclic aromatic monomer or oligo phenylene aromatic hydrocarbon monomer compounds are deposited on the solid substrate in step (a).

According to this preferred embodiment, two or more different monomer compounds, preferably having similar reactivity, are deposited on the surface of the solid substrate, followed by inducing polymerization to form a co-polymer, preferably a linear co-polymer. Subsequently, a partial or complete cyclodehydrogenation reaction is carried out leading to a segmented graphene nanoribbon.

In a variation of this preferred embodiment, a first polycyclic aromatic monomer or oligo phenylene aromatic hydrocarbon monomer compound is deposited on the surface of the solid substrate, followed by inducing polymerization to form a polymer, preferably a linear polymer. A second monomer is then deposited on the same substrate surface, followed by inducing polymerization to form a block co-polymer, preferably a linear block co-polymer. This step may optionally be repeated several times, either with identical or different monomer compounds to yield a multi block copolymer. Subsequently, the block co-polymer is subjected to a partial or complete cyclodehydrogenation reaction leading to a segmented graphene nanoribbon.

In a preferred embodiment, the partial or complete cyclodehydrogenation reaction is induced by a spatially controlled external stimulus.

The external stimulus may be an electrical current, heat, an ion beam, oxidative plasma, microwave, light or electromagnetic radiation in general or it may be an oxidative chemical reagent. The spatial control of the activation may be done using a highly focused activation stimulus whose position versus the substrate can be controlled. The spatially confined activation stimulus may originate from a nano sized electrode, such as e.g. a tip of a tunneling microscope or from highly focused electromagnetic radiation such as e.g. a focused laser beam, or from a highly focused electron beam such as in an electron microscope. The spatial control of the activation may also be done using a nanostructured mask to direct the impact of the activation stimulus, such as e.g. a photomask.

The resulting segmented graphene nanoribbons may be used directly on the substrate on which they are prepared or they may be transferred to another substrate.

EXAMPLES

1. Experimental Details

The molecular precursor 10,10'-dibromo-9,9'-bianthryl was sublimated at a rate of 1 Å/min for 100 seconds onto a clean Au(111) single crystal substrate which was cleaned by repeated cycles of argon ion bombardment and annealing to 750 K. The substrate was maintained at room temperature during deposition and then immediately annealed to 480 K to induce dehalogenation and radical addition. Then the sample was post-annealed at 600 K for 5 min to partially cyclodehydrogenate the polymers.

Example 1: Preparation of Segmented Graphene Nanoribbons from the Molecular Precursor 10,10'-dibromo-9,9'-bianthryl by Thermally Activated Cyclodehydrogenation The key step of the bottom-up GNR fabrication method is the surface-assisted thermally induced cyclodehydrogenation of linear polyphenylenes on Au or Ag templates. The method, which does not need a Lewis acid or other catalyst than the supporting metal substrate, is highly selective and efficient. Scanning tunneling microscopy (STM) experiments demonstrate that polyanthrylene chains adsorbed on Au or Ag substrates undergo cyclodehydrogenation upon annealing at 670 K: The ends of the anthryl units alternately pointing "up" and "down" couple with each other and transform the buckled polymer chain into a fully planar 7-AGNR (graphene nanoribbon with armchair configuration and 7 dimer lines across the segment width).

FIGS. 1a and 1b illustrates the realization of graphene nanoribbon heterojunctions by partial cyclodehydrogenation of polyanthrylene oligomers. FIG. 1a shows STM measurements and corresponding atomistic models demonstrating the synthesis of AGNRs starting from polyanthrylene chains assembled on a Au(111) substrate. Deposition of the molecular precursor on a substrate held at 470 K results in polyanthrylene oligomers (left) via surface-promoted monomer dehalogenation and intermolecular colligation of the resulting biradical intermediates Annealing at 670 K triggers cyclodehydrogenation resulting in 7-AGNRs (right). As shown in FIG. 1b, annealing at a reduced temperature of 600 K for 5 minutes results in partial cyclodehydrogenation and produces intra-ribbon heterojunctions. The STM image and the corresponding atomistic model show the realization of an atomically precise junction between a fully reacted N=7 AGNR of width w7=0.74 nm and a partially reacted polyanthrylene segment (N=5+) of width w5+=0.49 nm. STM images are acquired in constant current mode at 35 K (Vbias=1V 1=0.1 nA)

Example 2: Preparation of Segmented Graphene Nanoribbons from the Molecular Precursor 10,10'-dibromo-9,9'-bianthryl by STM Tip Induced Cyclodehydrogenation The cyclodehydrogenation is induced triggered by electron injection from the tip of the STM. Starting from heterojunctions obtained as outlined above in example 1 via moderate annealing, the length of 5+-AGNR regions is shortened in favor of 7-AGNR segments by controlled cyclodehydrogenation using voltage pulses applied to the STM tip.

Figure 2:
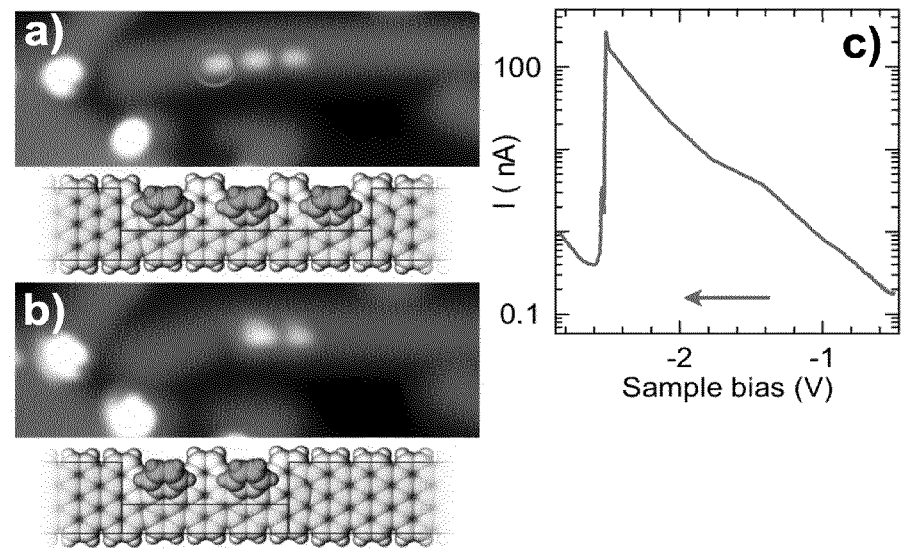

FIGS. 2a-c illustrate an example of a 7-GNR with a 5+-AGNR region, where the 5+-AGNR region is shortened by one unit via electron activated dehydrogenation. FIG. 2a (top left) shows STM image and corresponding atomistic model of a N=7 5+7 heterojunction obtained via thermally controlled annealing. FIG. 2b (bottom left) shows STM image and corresponding atomistic model of the previous heterojunction after tip induced dehydrogenation of one additional unit. The circle in FIG. 2a marks the lateral tip position during the electron activated dehydrogenation process. FIG. 2c (right) shows I-V curve revealing the activation of the reaction at −2.5V.

Figure 3:
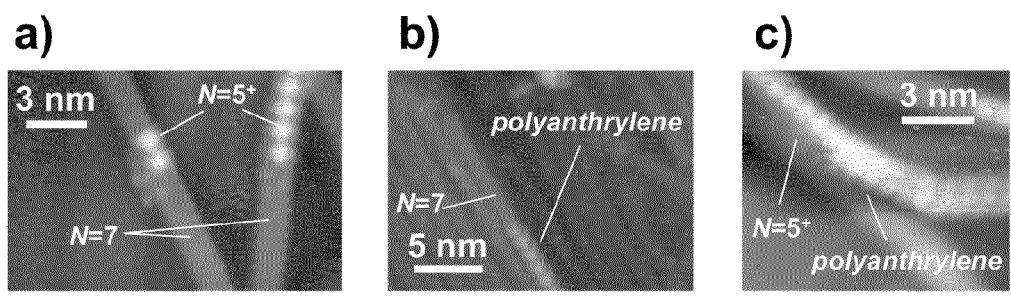

FIG. 3 shows STM topographs illustrating examples of ribbon heterostructures formed by partial cyclodehydrogenation of the polyanthrylene oligomers at 600 K (Vbias=−2V, 1=0.02 nA). FIG. 3a reveals two N=7 ribbons containing N=5+ segments. FIG. 3b shows a heterostructure consisting of N=7 AGNR and polyanthrylene oligomer segments. FIG. 3c shows a N=5+ AGNR polyantrhylene oligomer heterostructure.

Figure 4:
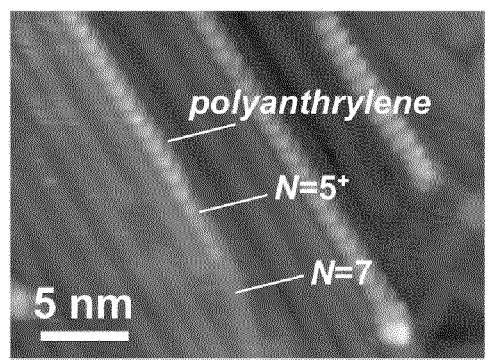

FIG. 4 shows an STM topograph illustrating a ribbon heterojunction with three different segments formed by partial cyclodehydrogenation of polyanthrylene oligomers at 600 K (Vbias=−2V, 1=0.02 nA). The segments are polyanthrylene oligomer, N=5+ AGNR, and N=7 AGNR.

Example 3: Preparation of Segmented Graphene Nanoribbons by Thermal Annealation of Unsegmented Graphene Nanoribbons AGNRs are prepared starting from polyanthrylene chains assembled on a Au(111) substrate. Deposition of the molecular precursor on a substrate held at 470 K results in polyanthrylene oligomers via surface-promoted monomer dehalogenation and intermolecular colligation of the resulting biradical intermediates Annealing at 670 K triggers cyclodehydrogenation resulting in unsegmented 7-AGNRs. Post annealing at 710 K for 5 minutes results in segmented graphene nanoribbons by thermal annelation of the unsegmented ribbons.

Figure 5:
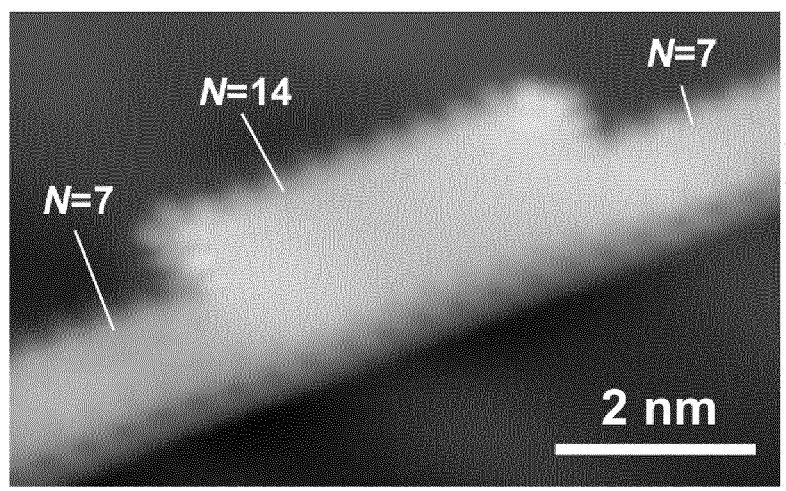

FIG. 5 shows an STM topograph illustrating a ribbon heterojunction formed by post-annealing the polyanthrylene oligomers at 710 K (Vbias=−0.5V, 1=0.1 nA). At this temperature dehydrogenative edge coupling between individual N=7 AGNRs is triggered to form N=14 AGNR segments (of width w14=1.60 nm) within N=7 AGNRs (of width w7=0.74 nm).

The invention claimed is:

1. A process for preparing the segmented graphene nanoribbon comprising:
    at least two different graphene segments covalently linked to each other;
    wherein each graphene segment has a monodisperse segment width;
    wherein the segment width of at least one of the graphene segments is 4 nm or less, wherein said process comprises:

(a) depositing at least one polycyclic aromatic monomer compound and/or oligo phenylene aromatic hydrocarbon monomer compound on a solid substrate;

(b) polymerizing the polycyclic aromatic and/or oligo phenylene aromatic hydrocarbon monomer compound so as to form at least one polymeron the surface of the solid substrate; and (c) at least partially cyclodehydrogenating the one or more polymers of (b).

2. The process of claim 1, wherein each graphene segment of the segmented graphene nanoribbon has a monodisperse segment width of 4 nm or less.

3. The process of claim 1, wherein each graphene segment has a repeating unit derived from at least one substituted or unsubstituted polycyclic aromatic monomer compound, and/or from at least one substituted or unsubstituted oligo phenylene aromatic hydrocarbon monomer compound.

4. The process of claim 3, wherein the repeating units of different graphene segments differ in at least in one property selected from the group consisting of segment width, substituents attached to the repeating unit, degree of annelation of aromatic rings, degree of cyclodehydrogenation, and number of annelated aromatic rings.

5. The process of claim 1, wherein each of the segments of the segmented graphene nanoribbon has a length in the range of 0.25 to 250 nm, and/or the total length of the segmented graphene nanoribbon is at least 4 nm.

6. The process of claim 1, wherein the segments of the segmented graphene nanoribbon are in a linear arrangement, or at least one segment of the segmented graphene nanoribbon is covalently linked to at least three neighbouring segments.

7. The process of claim 1, wherein at least one of the graphene segments has a substituted or unsubstituted repeating unit with Ni dimer lines across the segment width, and at least one of the graphene segments has a substituted or unsubstituted repeating unit with N2 dimer lines across the segment width, wherein N1=5 to 13, and N2=k×N1, with k=2, 3, or 4.

8. The process of claim 1, wherein the two or more different graphene segments have repeating units which are derived from substituted or unsubstituted anthracene monomer compounds.

9. The process of claim 8, wherein the segmented graphene nanoribbon has the structure Ia:

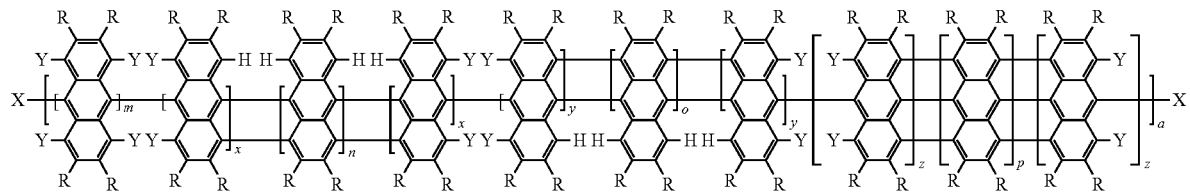

m = 0-1000
x = 0 or 1
n = 0 if x = 0
n = 0-1000 if x = 1
y = 0 or 1
o = 0 if y = 0
o = 0-1000 if y = 1
z = 0 or 1
p = 0 if z = 0
p = 0-1000 if z = 1
a = 1-50 under the provision that at least two of m, x, n, y, o, z, and p are ≥1; and
m+x+n+y+o+z+p≥10;
and wherein X are each independently H, a halogen, SH, $SR_3$, OH, $OR_3$, $OSO_2R_3$, $(SO)R_3$, $(SO_2)R_3$, $NR_1R_2$, $NO_2$, $POR_3R_3$, $PO(OR_3)R_3$, $PO(OR_3)_2$, $B(R_3)_2$, $B(OR_3)_2$, $(CO)R_3$, $(CO)OR_3$;

Y are each independently H or two Y together form a direct bond between neighbouring repeating units;

R are each independently hydrogen; linear or branched or cyclic $C_1$-$C_{12}$alkyl which is unsubstituted or substituted by one or more OH, $C_1$-$C_4$alkoxy, phenyl, or by CN; $C_2$-$C_{12}$alkyl which is interrupted by one or more non-consecutive O; halogen; OH; $OR_3$; $SR_3$; CN; $NO_2$; $NR_1R_2$; $(CO)R_3$; $(CO)OR_3$; $O(CO)OR_3$; $O(CO)NR_1R_2$; $O(CO)R_3$; $C_1$-$C_{12}$alkoxy; $C_1$-$C_{12}$alkylthio; $(C_1$-$C_6$alkyl)-$NR_7R_8$; or —O—$(C_1$-$C_6$alkyl)$NR_1R_2$; aryl or heteroaryl (wherein aryl is preferably phenyl, biphenyl, naphthyl, or anthryl all of which are unsubstituted or are substituted by one or more $C_1$-$C_4$-alkyl, CN, $OR_3$, $SR_3$, $CH_2OR_3$, $(CO)OR_3$, $(CO)NR_1R_2$ or halogen);

or two R together with the carbon atoms they are attached to form a 5-8-membered cycle or heterocycle;

$R_1$ and $R_2$ are each independently hydrogen, linear or branched $C_1$-$C_6$alkyl or phenyl, or $R_1$ and $R_2$ together with the nitrogen atom to which they are bonded to form a group selected from

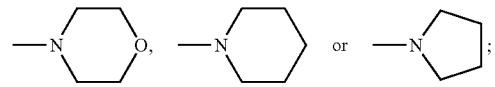

and $R_3$ is H, $C_1$-$C_{12}$alkyl, phenyl which is unsubstituted or is substituted by one or more $C_1$-$C_4$alkyl, phenyl, halogen, $C_1$-$C_4$alkoxy or $C_1$-$C_4$alkylthio.

10. The process of claim 1, wherein two or more different graphene segments have repeating units which are derived from substituted or unsubstituted pentacene monomer compounds.

11. The process of claim 10, wherein the segmented graphene nanoribbon has the structure II:

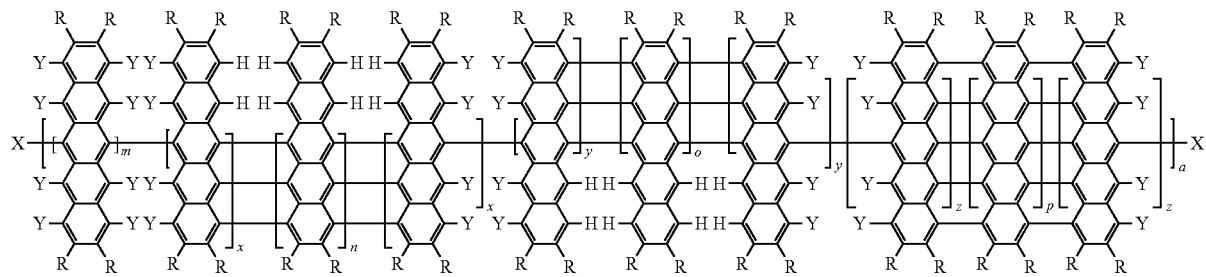

m = 0-1000
x = 0 or 1
n = 0 if x = 0
n = 0-1000 if x = 1
y = 0 or 1
o = 0 if y = 0
o = 0-1000 if y = 1
z = 0 or 1
p = 0 if z = 0
p = 0-1000 if z = 1
a = 1-50 under the provision that at least two of m, x, n, y, o, z, and p are ≥1;
wherein m+x+n+y+o+z+p≥10;
and wherein
X are each independently H, a halogen, SH, SR$_3$, OH, OR$_3$, OSO$_2$R$_3$, (SO)R$_3$, (SO$_2$)R$_3$, NR$_1$R$_2$, NO$_2$, POR$_3$R$_3$, PO(OR$_3$)R$_3$, PO(OR$_3$)$_2$, B(R$_3$)$_2$, B(OR$_3$)$_2$, (CO)R$_3$, (CO)OR$_3$;
Y are each independently H or two Y together form a direct bond between neighbouring repeating units;
R are each independently hydrogen; linear or branched or cyclic C$_1$-C$_{12}$alkyl which is unsubstituted or substituted by one or more OH, C$_1$-C$_4$alkoxy, phenyl, or by CN; C$_2$-C$_{12}$alkyl which is interrupted by one or more non-consecutive O; halogen; OH; OR$_3$; SR$_3$; CN; NO$_2$; NR$_1$R$_2$; (CO)R$_3$; (CO)OR$_3$; O(CO)OR$_3$; O(CO)NR$_1$R$_2$; O(CO)R$_3$; C$_1$-C$_{12}$alkoxy; C$_1$-C$_{12}$alkylthio; (C$_1$-C$_6$alkyl)-NR$_7$R$_8$; or —O—(C$_1$-C$_6$alkyl)NR$_1$R$_2$; aryl or heteroaryl (wherein aryl is preferably phenyl, biphenyl, naphthyl, or anthryl all of which are unsubstituted or are substituted by one or more C$_1$-C$_4$-alkyl, CN, OR$_3$, SR$_3$, CH$_2$OR$_3$, (CO)OR$_3$, (CO)NR$_1$R$_2$ or halogen);
or two R together with the carbon atoms they are attached to form a 5-8-membered cycle or heterocycle;
R$_1$ and R$_2$ are each independently hydrogen, linear or branched C$_1$-C$_6$alkyl or phenyl, or R$_1$ and R$_2$ together with the nitrogen atom to which they are bonded to form a group selected from

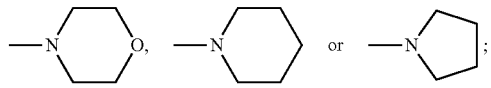

and
R$_3$ is H, C$_1$-C$_{12}$alkyl, phenyl which is unsubstituted or is substituted by one or more C$_1$-C$_4$alkyl, phenyl, halogen, C$_1$-C$_4$alkoxy or C$_1$-C$_4$alkylthio.

12. The process of claim 1, wherein two or more different graphene segments have repeating units which are derived from substituted or unsubstituted anthracene and pentacene monomer compounds.

13. The process of claim 12, wherein the segmented graphene nanoribbon has the structure IV:

IV

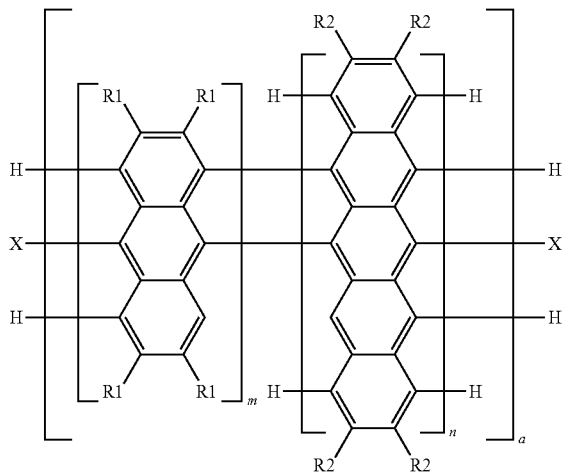

m, n = 1-1000
a = 1-50 wherein m+n≥10,
and wherein
X are each independently H, a halogen, SH, SR$_3$, OH, OR$_3$, OSO$_2$R$_3$, (SO)R$_3$, (SO$_2$)R$_3$, NR$_1$R$_2$, NO$_2$, POR$_3$R$_3$, PO(OR$_3$)R$_3$, PO(OR$_3$)$_2$, B(R$_3$)$_2$, B(OR$_3$)$_2$, (CO)R$_3$, (CO)OR$_3$;
R are each independently hydrogen; linear or branched or cyclic C$_1$-C$_{12}$alkyl which is unsubstituted or substituted by one or more OH, C$_1$-C$_4$alkoxy, phenyl, or by CN; C$_2$-C$_{12}$alkyl which is interrupted by one or more non-consecutive O; halogen; OH; OR$_3$; SR$_3$; CN; NO$_2$; NR$_1$R$_2$; (CO)R$_3$; (CO)OR$_3$; O(CO)OR$_3$; O(CO)NR$_1$R$_2$; O(CO)R$_3$; C$_1$-C$_{12}$alkoxy: C$_1$-C$_{12}$alkylthio; (C$_1$-C$_6$alkyl)-NR$_7$R$_8$; or —O—(C$_1$-C$_6$alkyl)NR$_1$R$_2$; aryl or heteroaryl (wherein aryl is preferably phenyl, biphenyl, naphthyl, or anthryl all of which are unsubstituted or are substituted by one or more C$_1$-C$_4$-alkyl, CN, OR$_3$, SR$_3$, CH$_2$OR$_3$, (CO)OR$_3$, (CO)NR$_1$R$_2$ or halogen);
or two R together with the carbon atoms they are attached to form a 5-8-membered cycle or heterocycle;
R$_1$ and R$_2$ are each independently hydrogen, linear or branched C$_1$-C$_6$alkyl or phenyl, or R$_1$ and R$_2$ together with the nitrogen atom to which they are bonded to form a group selected from

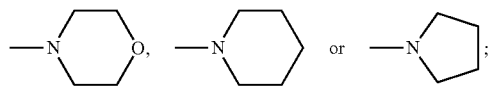

wherein R1 is a different structure than R2; and

R$_3$ is H, C$_1$-C$_{12}$alkyl, phenyl which is unsubstituted or is substituted by one or more C$_1$-C$_4$alkyl, phenyl, halogen, C$_1$-C$_4$alkoxy or C$_1$-C$_4$alkylthio.

14. The process of claim 1, wherein two or more different graphene segments have repeating units derived from substituted and/or unsubstituted naphthalene monomer compounds.

15. The process of claim 14 wherein the segmented graphene nanoribbon has the structure V:

V

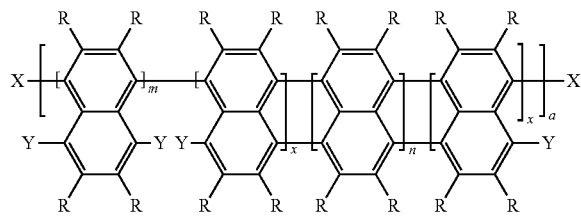

m = 0-1000
x = 0 or 1
n = 0 if x = 0
n = 0-1000 if x = 1
a = 1-50 under the provision that at least two of m, x, and n are ≥1; wherein m+x+n are ≥10;
and wherein X are each independently H, a halogen, SH, $SR_3$, OH, $OR_3$, $OSO_2R_3$, $(SO)R_3$, $(SO_2)R_3$, $NR_1R_2$, $NO_2$, $POR_3R_3$, $PO(OR_3)R_3$, $PO(OR_3)_2$, $B(R_3)_2$, $B(OR_3)_2$, $(CO)R_3$, $(CO)OR_3$;

Y are each independently H or two Y together form a direct bond between neighbouring repeating units;

R are each independently hydrogen; linear or branched or cyclic $C_1$-$C_{12}$alkyl which is unsubstituted or substituted by one or more OH, $C_1$-$C_4$alkoxy, phenyl, or by CN; $C_2$-$C_{12}$alkyl which is interrupted by one or more non-consecutive O; halogen; OH; $OR_3$; $SR_3$; CN; $NO_2$; $NR_1R_2$; $(CO)R_3$; $(CO)OR_3$; $O(CO)OR_3$; O(CO)

and $R_3$ is H, $C_1$-$C_{12}$alkyl, phenyl which is unsubstituted or is substituted by one or more $C_1$-$C_4$alkyl, phenyl, halogen, $C_1$-$C_4$alkoxy or $C_1$-$C_4$alkylthio.

16. The process of claim 1, wherein at least one of the segments has a substituted or unsubstituted repeating unit with N1=5 and at least one of the segments has a substituted or unsubstituted repeating unit with N2=10 or 15, wherein N1 and N2 are the number of dimer lines across the segment width.

17. The process of claim 16 wherein the segmented graphene nanoribbon has the structure XI:

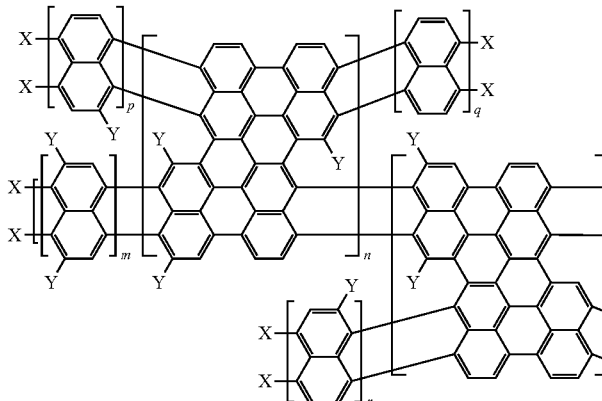 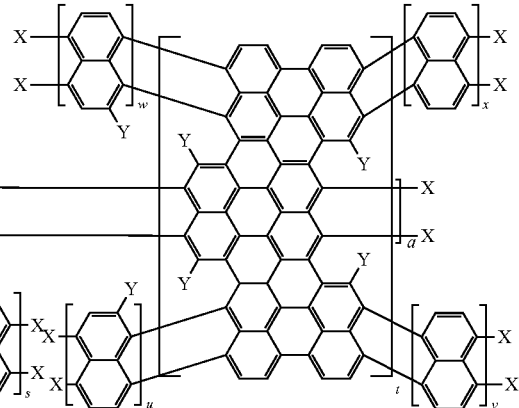

m, n, o, p, q, r, s, t, u, v, w,
x = 0-1000
a = 1-50

$NR_1R_2$; $O(CO)R_3$; $C_1$-$C_{12}$alkoxy; $C_1$-$C_{12}$alkylthio; $(C_1$-$C_6$alkyl)-$NR_7R_8$; or —O—$(C_1$-$C_6$alkyl)$NR_1R_2$; aryl or heteroaryl (wherein aryl is preferably phenyl, biphenyl, naphthyl, or anthryl all of which are unsubstituted or are substituted by one or more $C_1$-$C_4$-alkyl, CN, $OR_3$, $SR_3$, $CH_2OR_3$, $(CO)OR_3$, $(CO)NR_1R_2$ or halogen);

or two R together with the carbon atoms they are attached to form a 5-8-membered cycle or heterocycle;

$R_1$ and $R_2$ are each independently hydrogen, linear or branched $C_1$-$C_6$alkyl or phenyl, or $R_1$ and $R_2$ together with the nitrogen atom to which they are bonded to form a group selected from

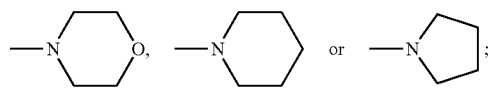

under the proviso that at least one m, p, q, r, s, u, v, w, and x is ≥1, and at least one of n, o, and t is ≥1;
wherein m+n+o+p+q+r+s+t+u+v+w+x≥10;
and wherein X are each independently H, a halogen, SH, $SR_3$, OH, $OR_3$, $OSO_2R_3$, $(SO)R_3$, $(SO_2)R_3$, $NR_1R_2$, $NO_2$, $POR_3R_3$, $PO(OR_3)R_3$, $PO(OR_3)_2$, $B(R_3)_2$, $B(OR_3)_2$, $(CO)R_3$, $(CO)OR_3$;

Y are each independently H or two Y together form a direct bond between neighbouring repeating units.

18. The process of claim 1, wherein at least one of the segments has a substituted or unsubstituted repeating unit with N1=7 and at least one of the segments has a substituted or unsubstituted repeating unit with N2=14 or 21, wherein N1 and N2 are the number of dimer lines across the segment width.

19. The process of claim 18 wherein the segmented graphene nanoribbon has the structure If:

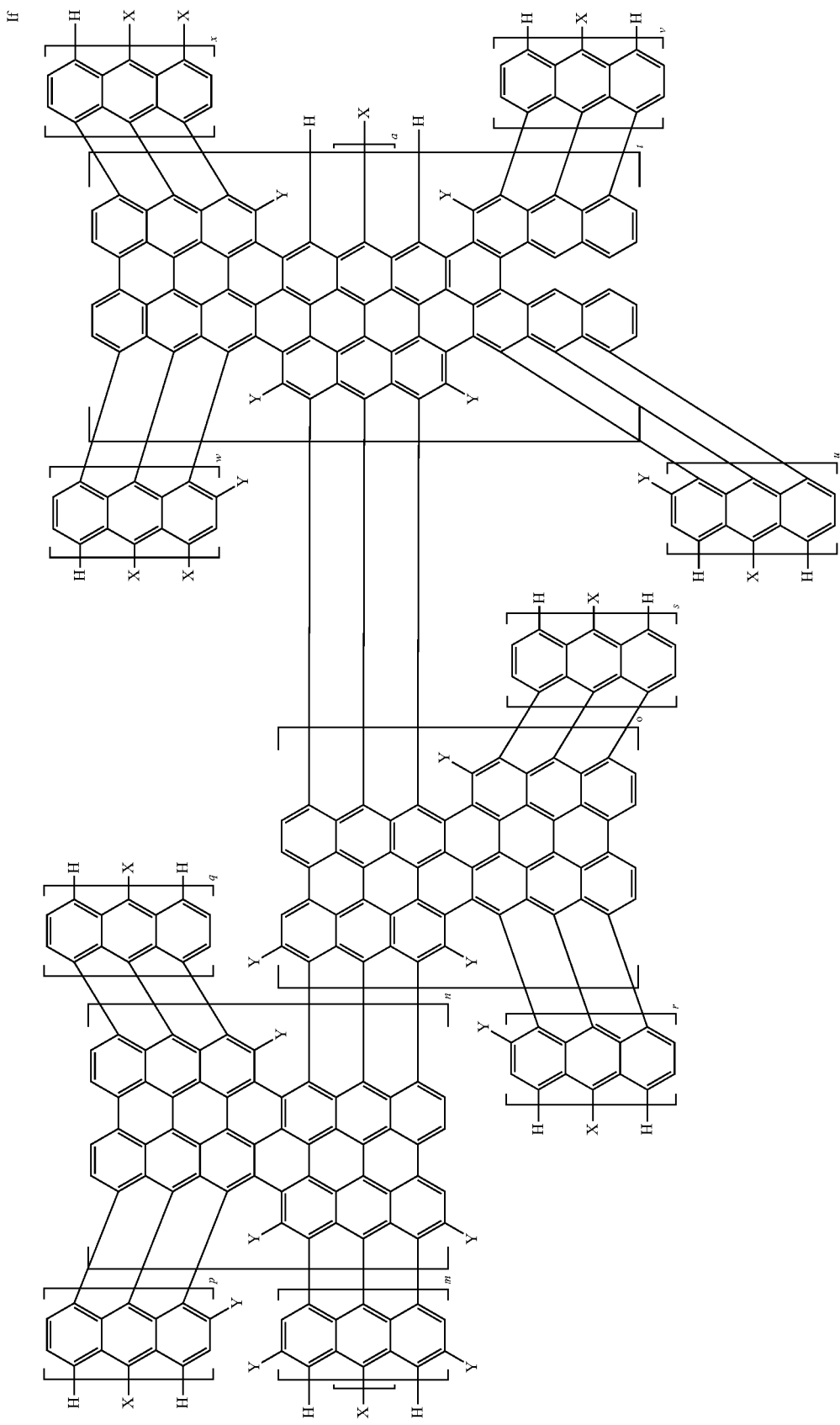
m, n, o, p, q, r, s, t, u, v, w,
x = 0-1000
a = 1-50 under the proviso that at least one m, p, q, w, x, r, s, and v are ≥1, and at least one of n, o, and t are ≥1;
wherein m+n+o+p+q+r+s+t+u+v+w+x≥10;
and wherein
X are each independently H, a halogen, SH, SR₃, OH, OR₃, OSO₂R₃, (SO)R₃, (SO₂)R₃, NR₁R₂, NO₂, POR₃R₃, PO(OR₃)R₃, PO(OR₃)₂, B(R₃)₂, B(OR₃)₂, (CO)R₃, (CO)OR₃;
Y are each independently H or two Y together form a direct bond between neighbouring repeating units.

20. The process of claim 1, comprising at least one heterojunction.

21. A segmented graphene nanoribbon, comprising:
at least two different graphene segments covalently linked to each other;
wherein each graphene segment has a monodisperse segment width;
wherein the segment width of at least one of the graphene segments is 4 nm or less,
wherein the two or more different graphene segments have repeating units which are derived from substituted or unsubstituted anthracene monomer compounds and
wherein the segmented graphene nanoribbon has the structure Ia:

NR₁R₂; O(CO)R₃; C₁-C₁₂alkoxy: C₁-C₁₂alkylthio; (C₁-C₆alkyl)-NR₇R₈; or —O—(C₁-C₆alkyl)NR₁R₂; aryl or heteroaryl (wherein aryl is preferably phenyl, biphenyl, naphthyl, or anthryl all of which are unsubstituted or are substituted by one or more C₁-C₄-alkyl, CN, OR₃, SR₃, CH₂OR₃, (CO)OR₃, (CO)NR₁R₂ or halogen);

or two R together with the carbon atoms they are attached to form a 5-8-membered cycle or heterocycle;

R₁ and R₂ are each independently hydrogen, linear or branched C₁-C₆alkyl or phenyl, or R₁ and R₂ together with the nitrogen atom to which they are bonded to form a group selected from

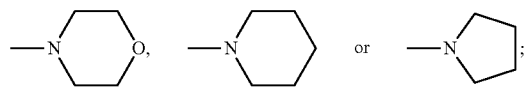

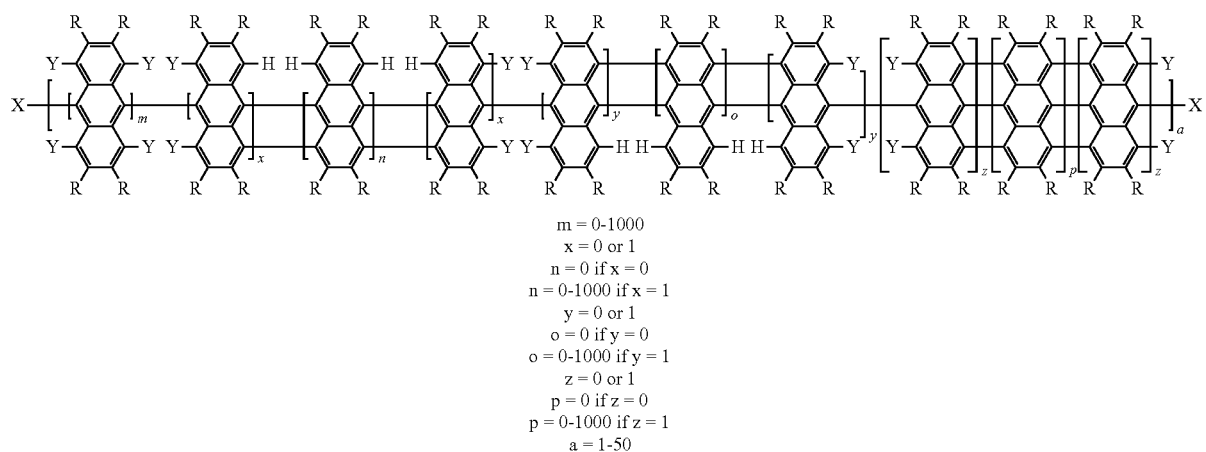

m = 0-1000
x = 0 or 1
n = 0 if x = 0
n = 0-1000 if x = 1
y = 0 or 1
o = 0 if y = 0
o = 0-1000 if y = 1
z = 0 or 1
p = 0 if z = 0
p = 0-1000 if z = 1
a = 1-50 under the provision that at least two of m, x, n, y, o, z, and p are ≥1; and
m+x+n+y+o+z+p≥10;
and wherein
X are each independently H, a halogen, SH, SR₃, OH, OR₃, OSO₂R₃, (SO)R₃, (SO₂)R₃, NR₁R₂, NO₂, POR₃R₃, PO(OR₃)R₃, PO(OR₃)₂, B(R₃)₂, B(OR₃)₂, (CO)R₃, (CO)OR₃;
Y are each independently H or two Y together form a direct bond between neighbouring repeating units;
R are each independently hydrogen; linear or branched or cyclic C₁-C₁₂alkyl which is unsubstituted or substituted by one or more OH, C₁-C₄alkoxy, phenyl, or by CN; C₂-C₁₂alkyl which is interrupted by one or more non-consecutive O; halogen; OH; OR₃; SR₃; CN; NO₂; NR₁R₂; (CO)R₃; (CO)OR₃; O(CO)OR₃; O(CO)

and
R₃ is H, C₁-C₁₂alkyl, phenyl which is unsubstituted or is substituted by one or more C₁-C₄alkyl, phenyl, halogen, C₁-C₄alkoxy or C₁-C₄alkylthio.

22. A segmented graphene nanoribbon, comprising:
at least two different graphene segments covalently linked to each other;
wherein each graphene segment has a monodisperse segment width;
wherein the segment width of at least one of the graphene segments is 4 nm or less,
wherein two or more different graphene segments have repeating units which are derived from substituted or unsubstituted pentacene monomer compounds and
wherein the segmented graphene nanoribbon has the structure II:

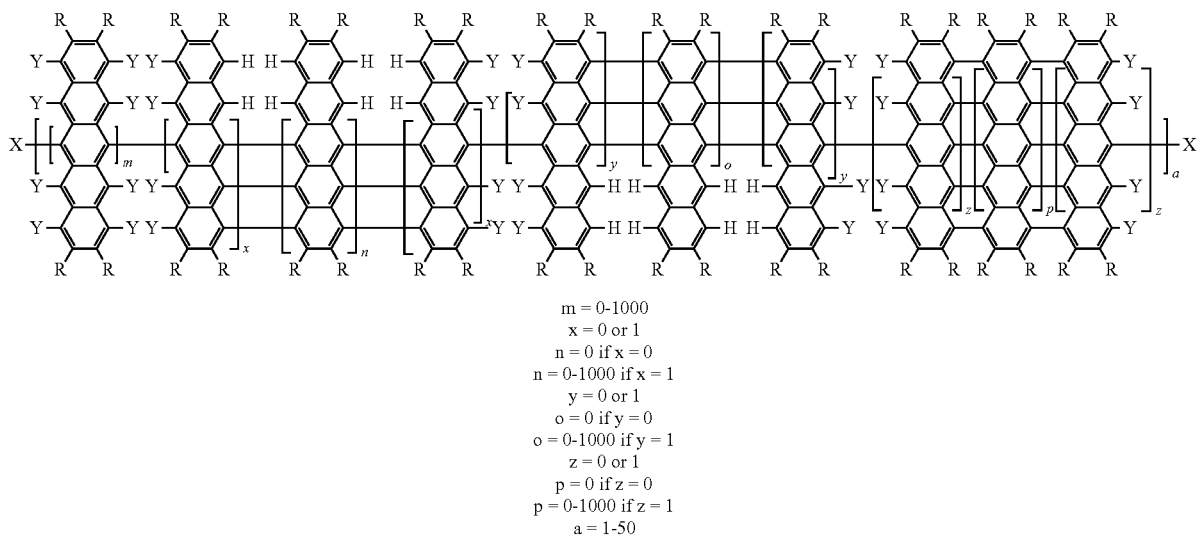

```
m = 0-1000
x = 0 or 1
n = 0 if x = 0
n = 0-1000 if x = 1
y = 0 or 1
o = 0 if y = 0
o = 0-1000 if y = 1
z = 0 or 1
p = 0 if z = 0
p = 0-1000 if z = 1
a = 1-50
``` under the provision that at least two of m, x, n, y, o, z, and p are ≥1;

wherein m+x+n+y+o+z+p≥10;

and wherein

X are each independently H, a halogen, SH, SR$_3$, OH, OR$_3$, OSO$_2$R$_3$, (SO)R$_3$, (SO$_2$)R$_3$, NR$_1$R$_2$, NO$_2$, POR$_3$R$_3$, PO(OR$_3$)R$_3$, PO(OR$_3$)$_2$, B(R$_3$)$_2$, B(OR$_3$)$_2$, (CO)R$_3$, (CO)OR$_3$;

Y are each independently H or two Y together form a direct bond between neighbouring repeating units;

R are each independently hydrogen; linear or branched or cyclic C$_1$-C$_{12}$alkyl which is unsubstituted or substituted by one or more OH, C$_1$-C$_4$alkoxy, phenyl, or by CN; C$_2$-C$_{12}$alkyl which is interrupted by one or more non-consecutive O; halogen; OH; OR$_3$; SR$_3$; CN; NO$_2$; NR$_1$R$_2$; (CO)R$_3$; (CO)OR$_3$; O(CO)OR$_3$; O(CO)NR$_1$R$_2$; O(CO)R$_3$; C$_1$-C$_{12}$alkoxy: C$_1$-C$_{12}$alkylthio; (C$_1$-C$_6$alkyl)-NR$_7$R$_8$; or —O—(C$_1$-C$_6$alkyl)NR$_1$R$_2$; aryl or heteroaryl (wherein aryl is preferably phenyl, biphenyl, naphthyl, or anthryl all of which are unsubstituted or are substituted by one or more C$_1$-C$_4$-alkyl, CN, OR$_3$, SR$_3$, CH$_2$OR$_3$, (CO)OR$_3$, (CO)NR$_1$R$_2$ or halogen);

or two R together with the carbon atoms they are attached to form a 5-8-membered cycle or heterocycle;

R$_1$ and R$_2$ are each independently hydrogen, linear or branched C$_1$-C$_6$alkyl or phenyl, or R$_1$ and R$_2$ together with the nitrogen atom to which they are bonded to form a group selected from

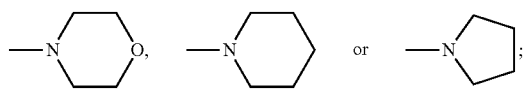

and

R$_3$ is H, C$_1$-C$_{12}$alkyl, phenyl which is unsubstituted or is substituted by one or more C$_1$-C$_4$alkyl, phenyl, halogen, C$_1$-C$_4$alkoxy or C$_1$-C$_4$alkylthio.

23. A segmented graphene nanoribbon, comprising:

at least two different graphene segments covalently linked to each other;

wherein each graphene segment has a monodisperse segment width;

wherein the segment width of at least one of the graphene segments is 4 nm or less, wherein two or more different graphene segments have repeating units which are derived from substituted or unsubstituted anthracene and pentacene monomer compounds and wherein the segmented graphene nanoribbon has the structure IV:

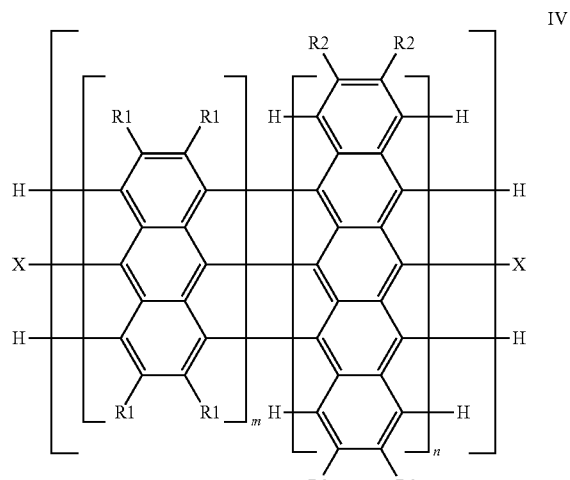

```
m, n = 1-1000
a = 1-50
``` wherein m+n≥0,
and wherein

X are each independently H, a halogen, SH, $SR_3$, OH, $OR_3$, $OSO_2R_3$, $(SO)R_3$, $(SO_2)R_3$, $NR_1R_2$, $NO_2$, $POR_3R_3$, $PO(OR_3)R_3$, $PO(OR_3)_2$, $B(R_3)_2$, $B(OR_3)_2$, $(CO)R_3$, $(CO)OR_3$;

R are each independently hydrogen; linear or branched or cyclic $C_1$-$C_{12}$alkyl which is unsubstituted or substituted by one or more OH, $C_1$-$C_4$alkoxy, phenyl, or by CN; $C_2$-$C_{12}$alkyl which is interrupted by one or more non-consecutive O; halogen; OH; $OR_3$; $SR_3$; CN; $NO_2$; $NR_1R_2$; $(CO)R_3$; $(CO)OR_3$; $O(CO)OR_3$; $O(CO)NR_1R_2$; $O(CO)R_3$; $C_1$-$C_{12}$alkoxy: $C_1$-$C_{12}$alkylthio; $(C_1$-$C_6$alkyl)-$NR_7R_8$; or —O—$(C_1$-$C_6$alkyl)$NR_1R_2$; aryl or heteroaryl (wherein aryl is preferably phenyl, biphenyl, naphthyl, or anthryl all of which are unsubstituted or are substituted by one or more $C_1$-$C_4$-alkyl, CN, $OR_3$, $SR_3$, $CH_2OR_3$, $(CO)OR_3$, $(CO)NR_1R_2$ or halogen);

or two R together with the carbon atoms they are attached to form a 5-8-membered cycle or heterocycle;

$R_1$ and $R_2$ are each independently hydrogen, linear or branched $C_1$-$C_6$alkyl or phenyl, or $R_1$ and $R_2$ together with the nitrogen atom to which they are bonded to form a group selected from

wherein R1 is a different structure than R2; and $R_3$ is H, $C_1$-$C_{12}$alkyl, phenyl which is unsubstituted or is substituted by one or more $C_1$-$C_4$alkyl, phenyl, halogen, $C_1$-$C_4$alkoxy or $C_1$-$C_4$alkylthio.

24. A segmented graphene nanoribbon, comprising:
at least two different graphene segments covalently linked to each other;
wherein each graphene segment has a monodisperse segment width;
wherein the segment width of at least one of the graphene segments is 4 nm or less,
wherein two or more different graphene segments have repeating units derived from substituted and/or unsubstituted naphthalene monomer compounds and
wherein the segmented graphene nanoribbon has the structure V:

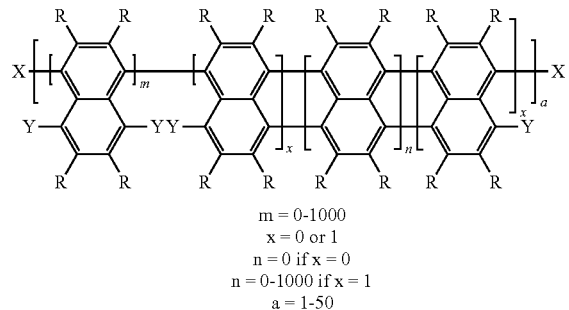

m = 0-1000
x = 0 or 1
n = 0 if x = 0
n = 0-1000 if x = 1
a = 1-50 under the provision that at least two of m, x, and n are ≥1;

wherein m+x+n are ≥10;

and wherein

X are each independently H, a halogen, SH, $SR_3$, OH, $OR_3$, $OSO_2R_3$, $(SO)R_3$, $(SO_2)R_3$, $NR_1R_2$, $NO_2$, $POR_3R_3$, $PO(OR_3)R_3$, $PO(OR_3)_2$, $B(R_3)_2$, $B(OR_3)_2$, $(CO)R_3$, $(CO)OR_3$;

Y are each independently H or two Y together form a direct bond between neighbouring repeating units;

R are each independently hydrogen; linear or branched or cyclic $C_1$-$C_{12}$alkyl which is unsubstituted or substituted by one or more OH, $C_1$-$C_4$alkoxy, phenyl, or by CN; $C_2$-$C_{12}$alkyl which is interrupted by one or more non-consecutive O; halogen; OH; $OR_3$; $SR_3$; CN; $NO_2$; $NR_1R_2$; $(CO)R_3$; $(CO)OR_3$; $O(CO)OR_3$; $O(CO)NR_1R_2$; $O(CO)R_3$; $C_1$-$C_{12}$alkoxy: $C_1$-$C_{12}$alkylthio; $(C_1$-$C_6$alkyl)-$NR_7R_8$; or —O—$(C_1$-$C_6$alkyl)$NR_1R_2$; aryl or heteroaryl (wherein aryl is preferably phenyl, biphenyl, naphthyl, or anthryl all of which are unsubstituted or are substituted by one or more $C_1$-$C_4$-alkyl, CN, $OR_3$, $SR_3$, $CH_2OR_3$, $(CO)OR_3$, $(CO)NR_1R_2$ or halogen);

or two R together with the carbon atoms they are attached to form a 5-8-membered cycle or heterocycle;

$R_1$ and $R_2$ are each independently hydrogen, linear or branched $C_1$-$C_6$alkyl or phenyl, or $R_1$ and $R_2$ together with the nitrogen atom to which they are bonded to form a group selected from

and $R_3$ is H, $C_1$-$C_{12}$alkyl, phenyl which is unsubstituted or is substituted by one or more $C_1$-$C_4$alkyl, phenyl, halogen, $C_1$-$C_4$alkoxy or $C_1$-$C_4$alkylthio.

25. A segmented graphene nanoribbon, comprising:
at least two different graphene segments covalently linked to each other;
wherein each graphene segment has a monodisperse segment width;
wherein the segment width of at least one of the graphene segments is 4 nm or less,
wherein at least one of the segments has a substituted or unsubstituted repeating unit with N1=5 and at least one of the segments has a substituted or unsubstituted repeating unit with N2=10 or 15, wherein Ni and N2 are the number of dimer lines across the segment width and
wherein the segmented graphene nanoribbon has the structure XI:

X are each independently H, a halogen, SH, $SR_3$, OH, $OR_3$, $OSO_2R_3$, $(SO)R_3$, $(SO_2)R_3$, $NR_1R_2$, $NO_2$, $POR_3R_3$, $PO(OR_3)R_3$, $PO(OR_3)_2$, $B(R_3)_2$, $B(OR_3)_2$, $(CO)R_3$, $(CO)OR_3$;

Y are each independently H or two Y together form a direct bond between neighbouring repeating units.

26. A segmented graphene nanoribbon, comprising:

at least two different graphene segments covalently linked to each other;
wherein each graphene segment has a monodisperse segment width;
wherein the segment width of at least one of the graphene segments is 4 nm or less,
wherein at least one of the segments has a substituted or unsubstituted repeating unit with N1=7 and at least one

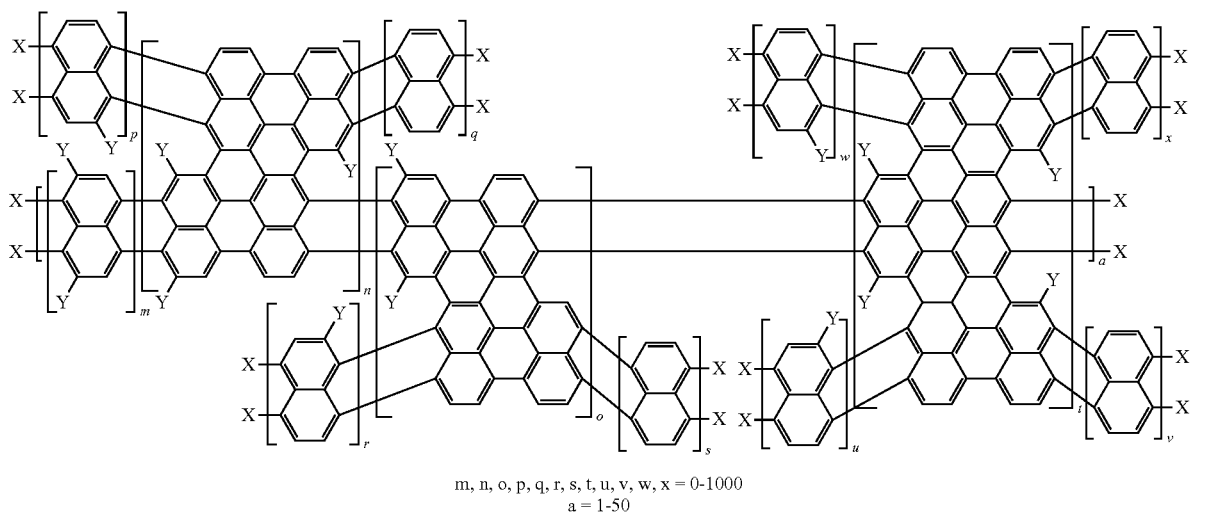

XI m, n, o, p, q, r, s, t, u, v, w, x = 0-1000
a = 1-50 under the proviso that at least one m, p, q, r, s, u, v, w, and x is ≥1, and at least one of n, o, and t is ≥1;

wherein m+n+o+p+q+r+s+t+u+v+w+x≥10;
and wherein of the segments has a substituted or unsubstituted repeating unit with N2=14 or 21, wherein N1 and N2 are the number of dimer lines across the segment width and
wherein the segmented graphene nanoribbon has the structure If:

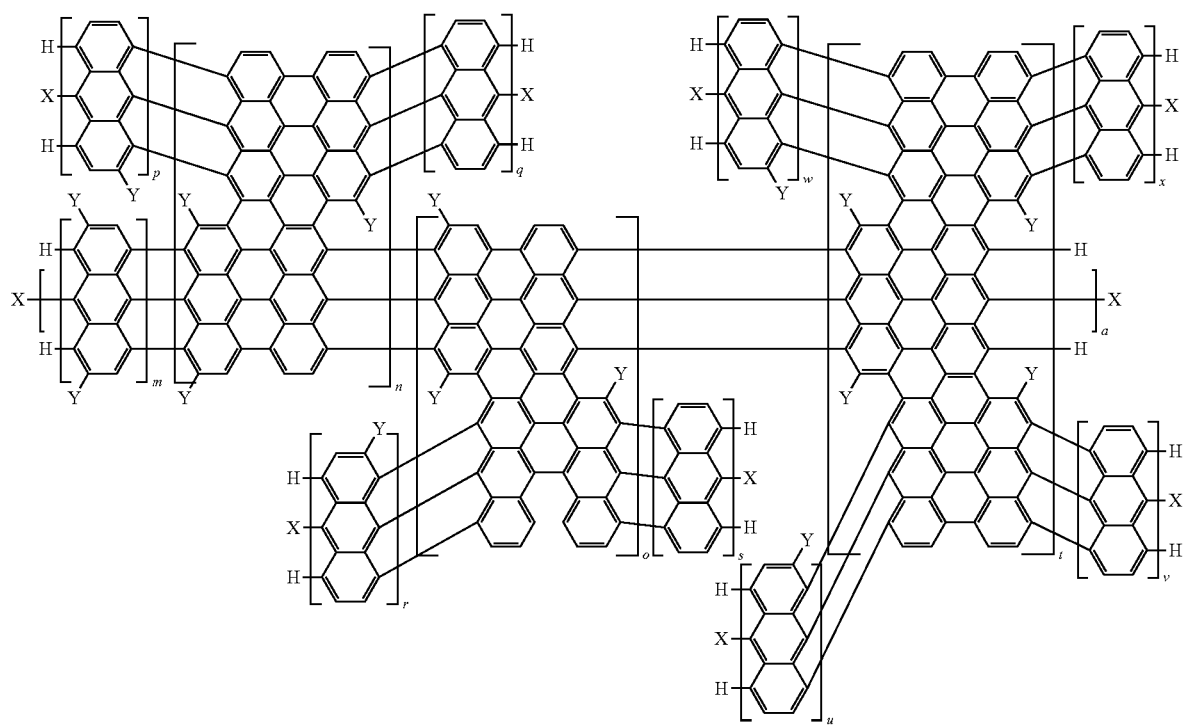

m, n, o, p, q, r, s, t, u, v, w, x = 0-1000
a = 1-50 under the proviso that at least one of m, p, q, w, x, r, s, u, and v are ≥1, and at least one of n, o, and t are ≥1;
wherein m+n+o+p+q+r+s+t+u+v+w+x≥10;
and wherein
X are each independently H, a halogen, SH, $SR_3$, OH, $OR_3$, $OSO_2R_3$, $(SO)R_3$, $(SO_2)R_3$, $NR_1R_2$, $NO_2$, $POR_3R_3$, $PO(OR_3)R_3$, $PO(OR_3)_2$, $B(R_3)_2$, $B(OR_3)_2$, $(CO)R_3$, $(CO)OR_3$;
Y are each independently H or two Y together form a direct bond between neighbouring repeating units.

If

27. A segmented graphene nanoribbon, comprising:
at least two different graphene segments covalently linked to each other;
wherein each graphene segment has a monodisperse segment width;
wherein the segment width of at least one of the graphene segments is 4 nm or less, and comprising at least one heterojunction.

* * * * *

UNITED STATES PATENT AND TRADEMARK OFFICE
CERTIFICATE OF CORRECTION

PATENT NO. : 9,975,777 B2
APPLICATION NO. : 14/357300
DATED : May 22, 2018
INVENTOR(S) : Roman Fasel et al.

Page 1 of 2

It is certified that error appears in the above-identified patent and that said Letters Patent is hereby corrected as shown below:

In the Specification

In Column 22, Line 62:
"is are" should read -- is/are --.

In Column 40, Line 46:
"intermediates" should read -- intermediates. --.

In Column 41, Line 11:
"N=7 5+7" should read -- N=7/5+/7 --;
Line 26:
"AGNR polyantrhylene" should read -- AGNR/polyantrhylene --; and
Line 45:
"intermediates" should read -- intermediates. --.

In the Claims

In Column 42, Line 54:
"Ni" should read -- N1 --.

In Column 46, Line 14:
"$C_1$-$C_{12}$alkoxy:" should read -- $C_1$-$C_{12}$alkoxy; --.

In Column 47, Line 49:
"$C_1$-$C_{12}$alkoxy:" should read -- $C_1$-$C_{12}$alkoxy; --.

Signed and Sealed this
Twenty-eighth Day of April, 2020

Andrei Iancu
*Director of the United States Patent and Trademark Office*

CERTIFICATE OF CORRECTION (continued)
U.S. Pat. No. 9,975,777 B2

In Columns 49-50, Line 1:

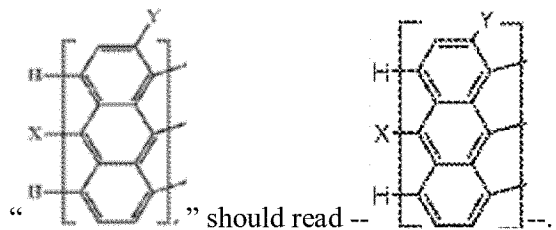 " should read -- [second structure] --.

In Column 52, Line 1:
"$C_1$-$C_{12}$alkoxy:" should read -- $C_1$-$C_{12}$alkoxy; --.

In Column 53, Line 43:
"$C_1$-$C_{12}$alkoxy:" should read -- $C_1$-$C_{12}$alkoxy; --.

In Column 54, Lines 46-62:

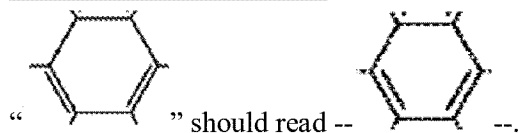 " should read -- [second structure] --.

In Column 55, Line 18:
"$C_1$-$C_{12}$alkoxy:" should read -- $C_1$-$C_{12}$alkoxy; --.

In Column 56, Line 40:
"$C_1$-$C_{12}$alkoxy:" should read -- $C_1$-$C_{12}$alkoxy; --.

In Column 57, Line 17:
"Ni" should read -- N1 --.